(12) United States Patent
Smith et al.

(10) Patent No.: US 8,201,974 B1
(45) Date of Patent: Jun. 19, 2012

(54) PAN-TILT SPOTLIGHT

(75) Inventors: Kevin M. Smith, Chester, CT (US);
David J. Sousa, Ivoryton, CT (US);
James L. Stopa, Old Saybrook, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 289 days.

(21) Appl. No.: 12/720,653

(22) Filed: Mar. 9, 2010

Related U.S. Application Data

(60) Provisional application No. 61/209,619, filed on Mar. 9, 2009.

(51) Int. Cl.
*F21S 6/00* (2006.01)

(52) U.S. Cl. ........ 362/257; 362/265; 362/269; 362/271; 362/545; 362/646; 340/686.1; 340/815.45; 315/118; 315/291; 315/292; 315/299

(58) Field of Classification Search .................. 362/216, 362/227, 249.01, 249.02, 257, 265, 269, 362/271, 543–545, 646; 340/686.1, 689, 340/686.3, 815.45; 315/79, 118, 291, 292, 315/297, 299, 312, 362
See application file for complete search history.

(56) References Cited

U.S. PATENT DOCUMENTS

| | | | |
|---|---|---|---|
| 3,631,328 A | 12/1971 | Borst et al. | |
| 3,732,537 A | 5/1973 | Freeman | |
| 3,979,649 A | 9/1976 | Persha | |
| 3,987,296 A | 10/1976 | Coppola et al. | |
| 4,065,806 A | 12/1977 | Satoh | |
| 4,115,841 A | 9/1978 | Alexander | |
| 4,779,168 A | 10/1988 | Montgomery | |
| 4,930,057 A | 5/1990 | Williams | |
| 5,490,046 A | 2/1996 | Gohl et al. | |
| 5,499,167 A | 3/1996 | Brown | |
| 5,584,560 A | 12/1996 | Gosswiller et al. | |
| 5,673,989 A | 10/1997 | Gohl et al. | |
| 5,695,272 A | 12/1997 | Snyder et al. | |
| 5,806,956 A | 9/1998 | Hyun-Jo | |
| 6,315,435 B1 | 11/2001 | Hamilton et al. | |
| 6,479,813 B2 | 11/2002 | Takada et al. | |
| 6,609,812 B2 | 8/2003 | Machi et al. | |
| 6,623,151 B2 * | 9/2003 | Pederson | 362/542 |
| 6,786,622 B1 | 9/2004 | Rice | |
| 6,879,263 B2 * | 4/2005 | Pederson et al. | 340/815.45 |
| 6,955,447 B2 | 10/2005 | Lui | |
| 6,960,776 B2 | 11/2005 | Machi | |
| 6,962,423 B2 | 11/2005 | Hamilton et al. | |
| 6,964,503 B2 | 11/2005 | Smith et al. | |
| 7,080,928 B2 | 7/2006 | Barnhart et al. | |
| 7,296,917 B1 | 11/2007 | Chiu | |

(Continued)

*Primary Examiner* — Haiss Philogene
(74) *Attorney, Agent, or Firm* — Alix, Yale & Ristas, LLP

(57) ABSTRACT

The disclosed pan-tilt spotlight is a sealed, remote controlled unit which allows continuous 360° rotation (pan) of visible or infrared (IR) light sources as well as vertical (tilt) aiming of the light sources 65° above horizontal and 25° below horizontal. The light sources are solid state (LEDs) which are energy efficient and extremely durable in the field, requiring little maintenance. Light shields are employed to control stray light, thereby enhancing the stealth of the spotlight in covert operations. The rotating parts of the spotlight are supported at several locations spaced from the axis of rotation in a manner that re-directs forces that would otherwise be carried by the shaft. Temperature sensitive current regulators and robust thermal design protect the LEDs from heat damage. Sophisticated motor control allows fast and precise positioning of the light beam and worm final drive gears keep the light beam in position.

4 Claims, 32 Drawing Sheets

U.S. PATENT DOCUMENTS

| | | |
|---|---|---|
| 7,452,091 B2 | 11/2008 | LeBlanc et al. |
| 7,473,041 B2 | 1/2009 | Stanev et al. |
| 8,066,402 B2 * | 11/2011 | Klipstein .................... 362/205 |
| 8,080,819 B2 * | 12/2011 | Mueller et al. .................. 257/13 |
| 2005/0248930 A1 | 11/2005 | Naval et al. |
| 2006/0232985 A1 | 10/2006 | Wang |

* cited by examiner

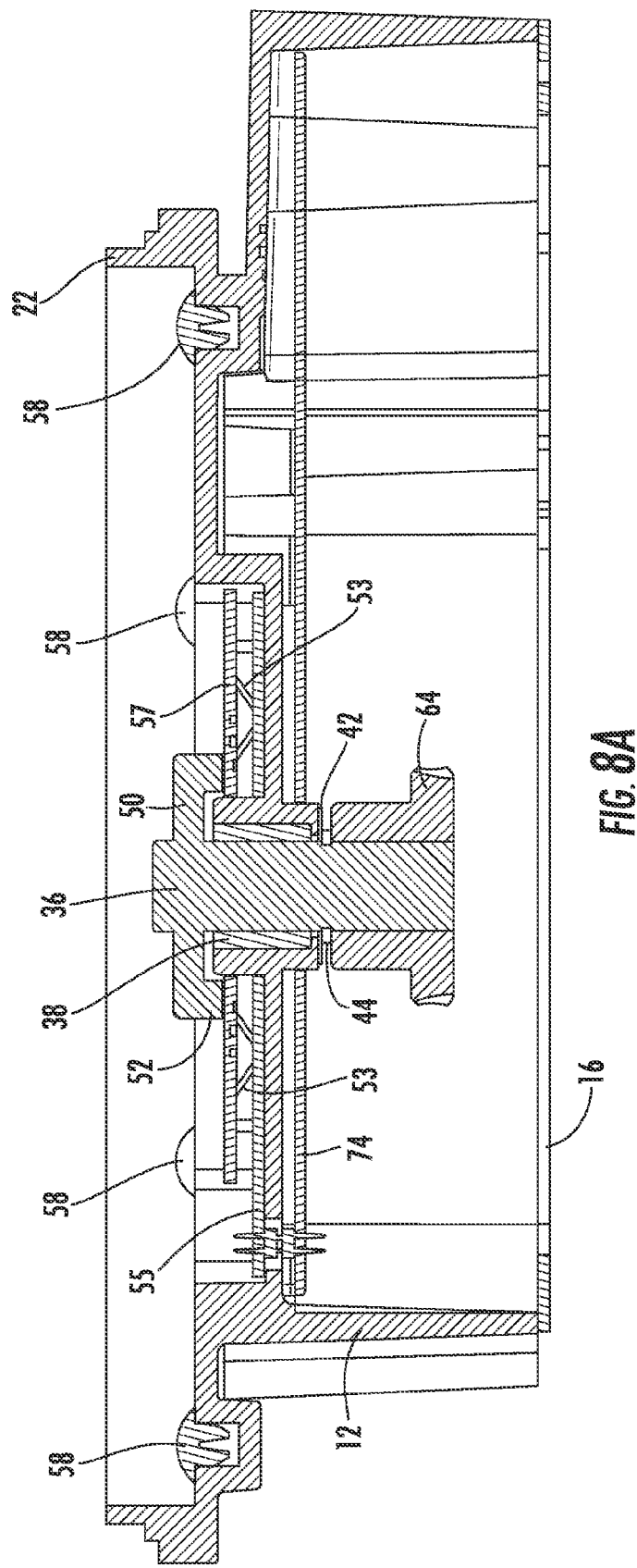

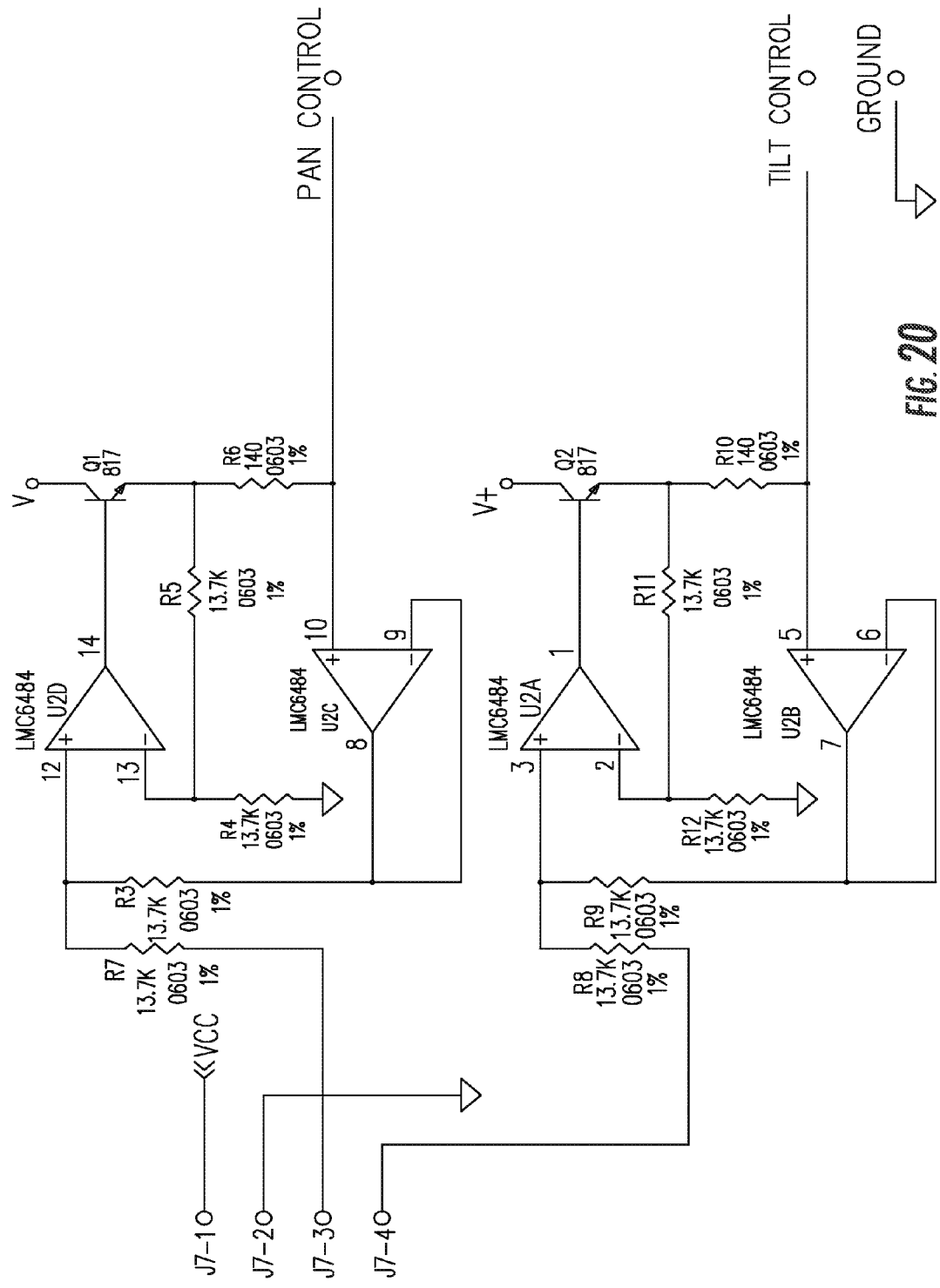

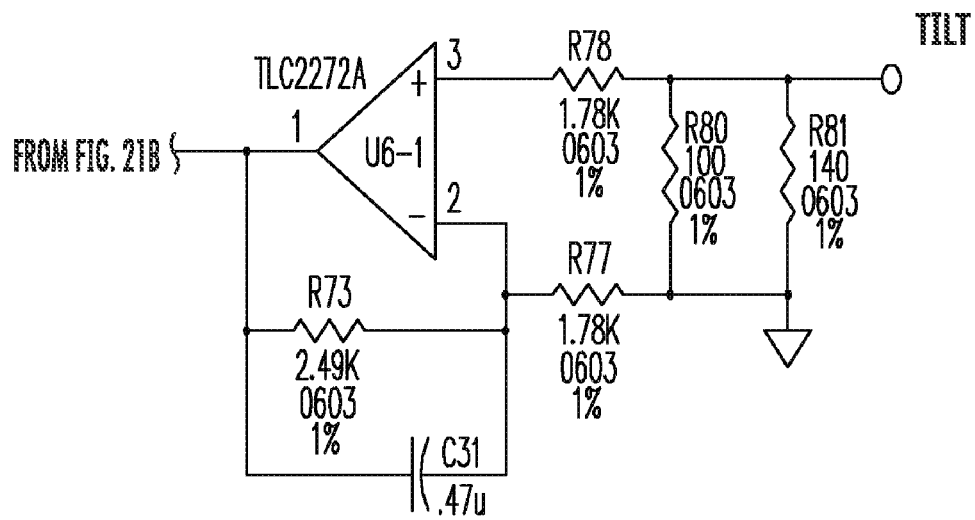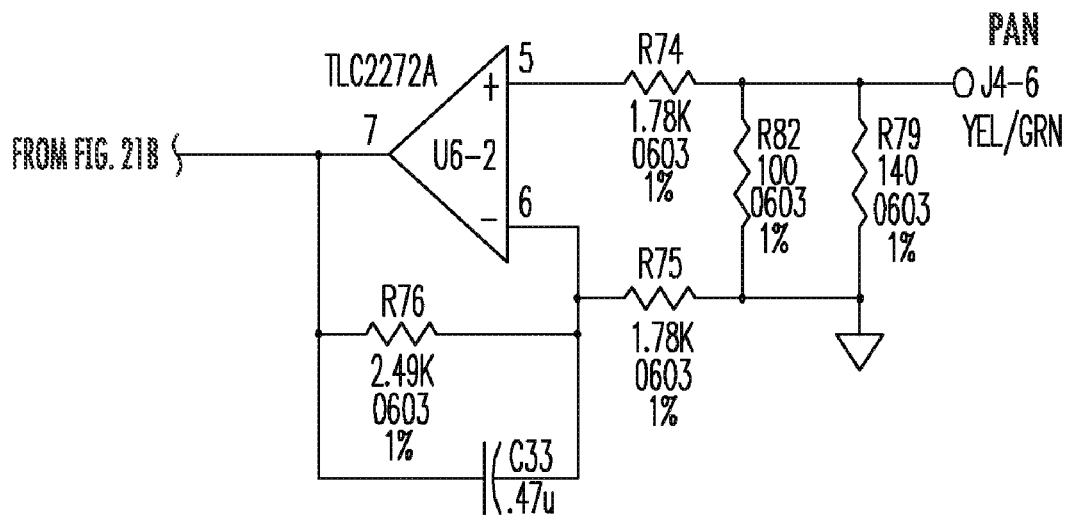
FIG. 21C

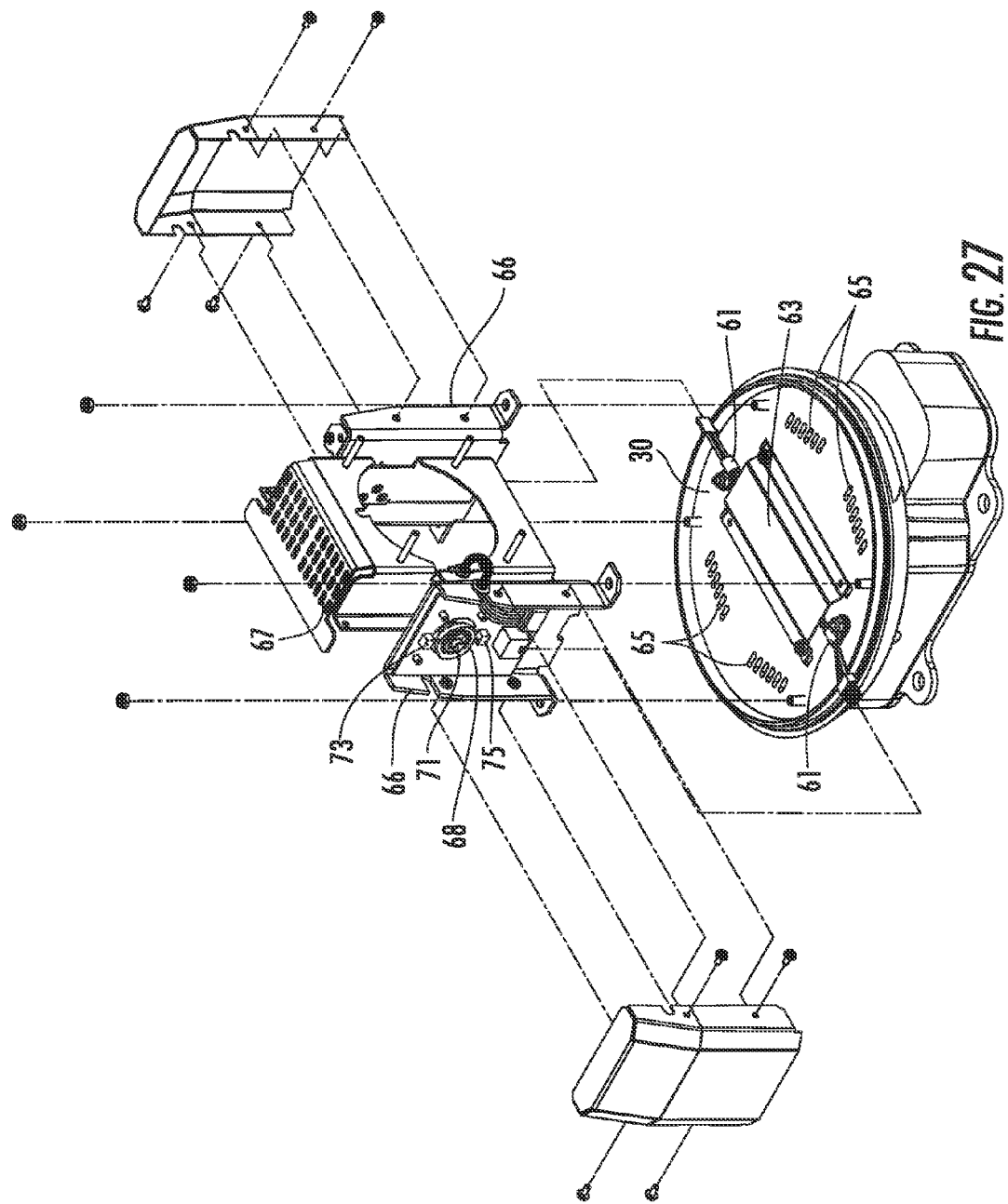

PAN-TILT SPOTLIGHT

CROSS REFERENCE TO RELATED APPLICATION

This application claims the benefit of U.S. Provisional Application No. 61/209,619, filed Mar. 9, 2009.

TECHNICAL FIELD

The disclosure generally relates to spotlights and, more particularly relates to searchlights with the capability to pan and tilt to direct the light beam.

Spotlights and searchlights mounted to land, water and air borne vehicles are well known. Traditional spotlights were mounted to the exterior of a vehicle at a location adjacent to the user so that the spotlight beam could be mechanically directed by the user. More recently, spotlights and searchlights have become available that employ motor-drive mechanisms which permit the spotlight to be located remotely from the user and employ a remote control connected to the spotlight by means of wires or wireless link such as RF.

SUMMARY

The disclosed pan-tilt spotlight is a sealed, remote controlled unit which allows continuous 360° rotation (pan) of visible or infrared (IR) light sources as well as vertical (tilt) aiming of the light sources 65° above horizontal and 25° below horizontal. The light sources are solid state (LEDs) which are energy efficient and extremely durable in the field, requiring little maintenance. Light shields are employed to control stray light, thereby enhancing the stealth of the spotlight in covert operations. Sliding contacts are employed to electrically connect the stationary parts of the spotlight with the moving parts, permitting continuous rotation. The rotating parts of the spotlight are supported at several locations spaced from the axis of rotation in a manner that re-directs forces that would otherwise be carried by the shaft. Temperature sensitive current regulators and robust thermal design protect the LEDs from heat damage. Sophisticated motor control allows fast and precise positioning of the light beam and use of planetary gears and worm final drive gears keep the light beam in position.

BRIEF DESCRIPTION OF THE DRAWINGS

FIG. 8A is a sectional view through the base, main shaft, slip ring assembly and motor control PC board of and alternative embodiment of the spotlight;

FIG. 20 is a schematic diagram of constant current sources employed to amplify control signals generated by the control interface assembly of FIG. 11;

FIG. 27 is an exploded perspective view of assembled base and turntable plate in conjunction with the tilt subassembly, fan shroud and covers.

DETAILED DESCRIPTION OF THE DISCLOSED EMBODIMENTS

Housing and Exterior Structure

Figure 1:
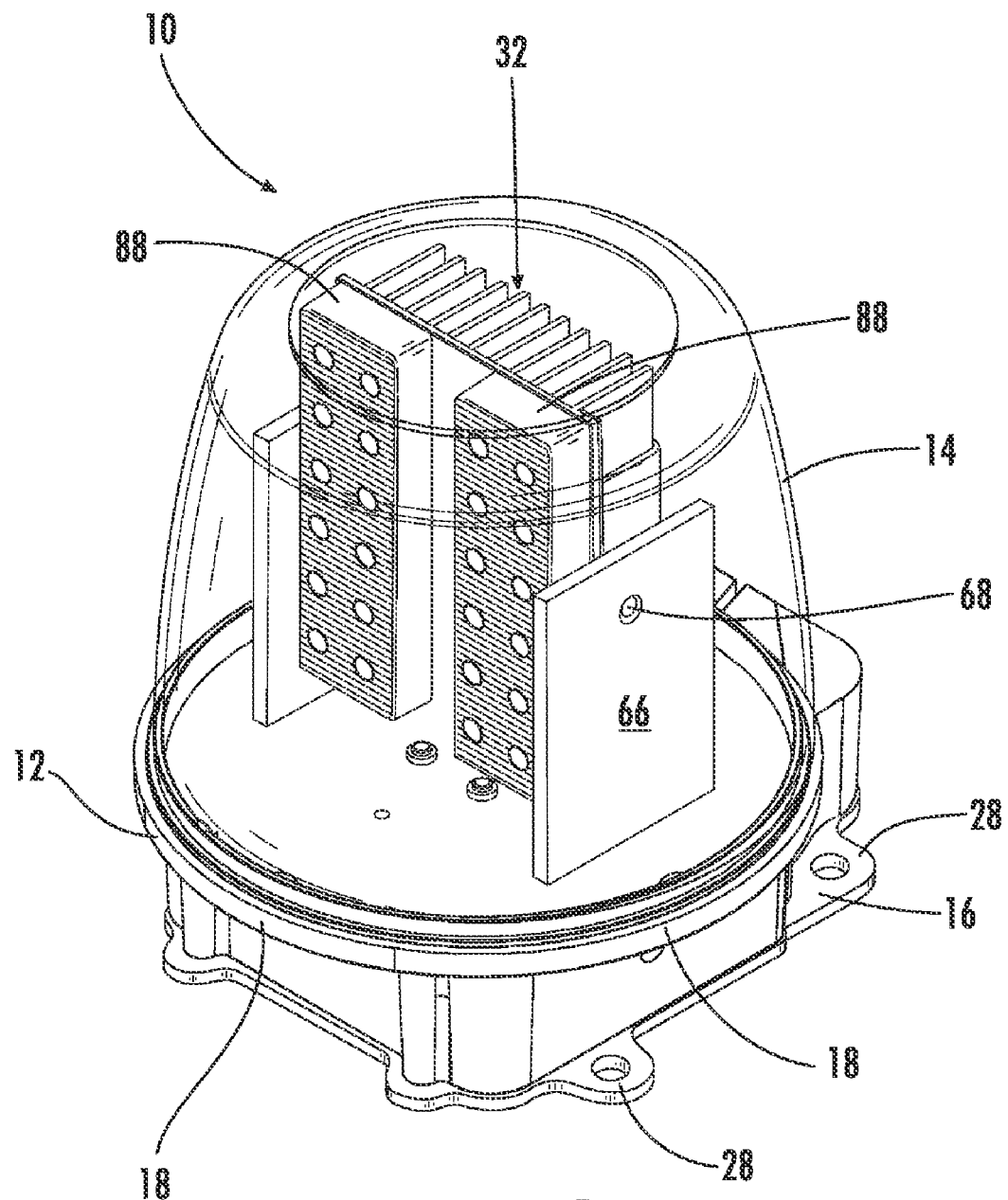
FIG. 1 is a perspective view of an exemplary pan-tilt spotlight according to aspects of the disclosure.
Figure 2:
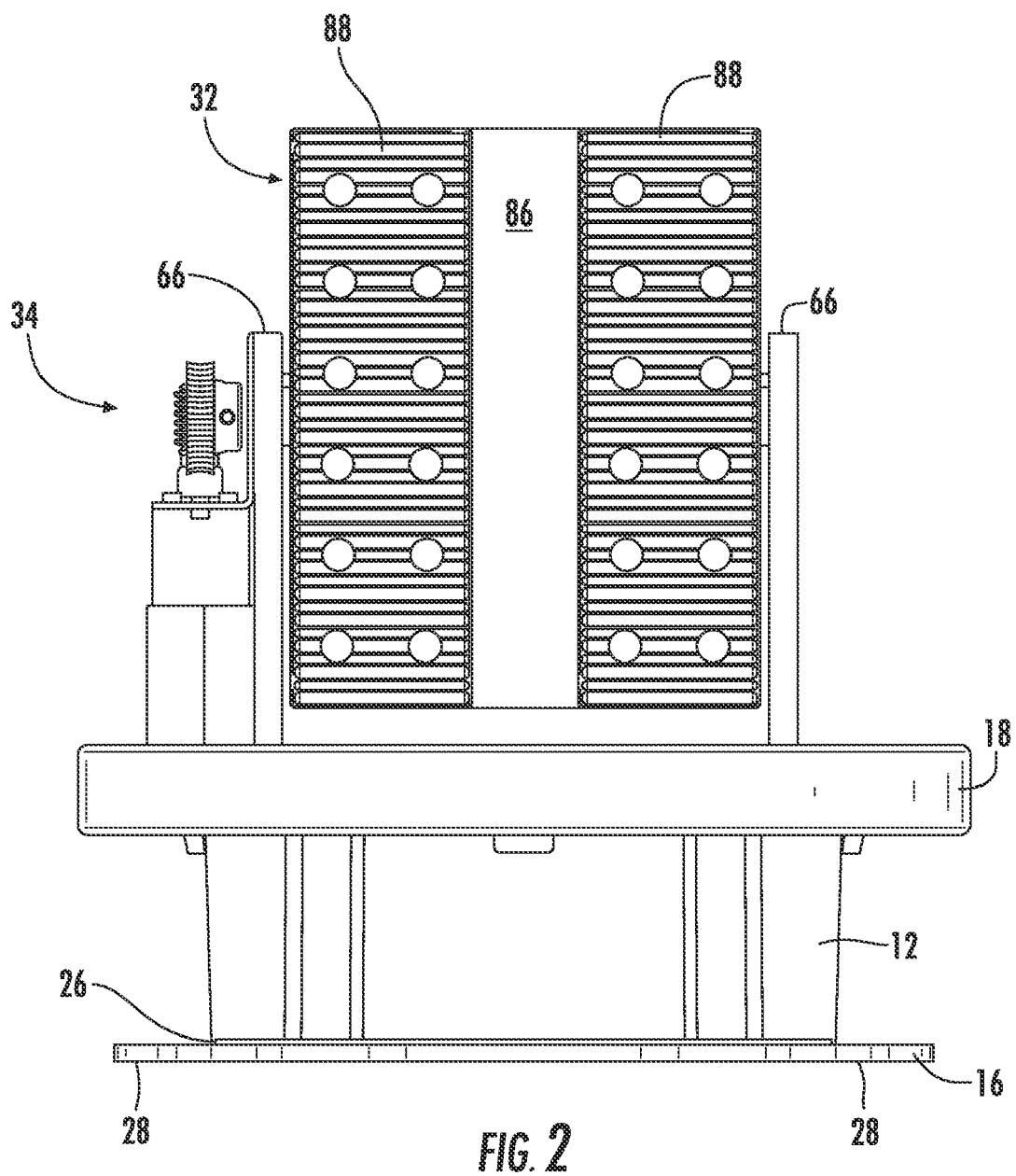
FIG. 2 is a front plan view of the pan-tilt spotlight of FIG. 1 with the dome removed.
Figure 3:
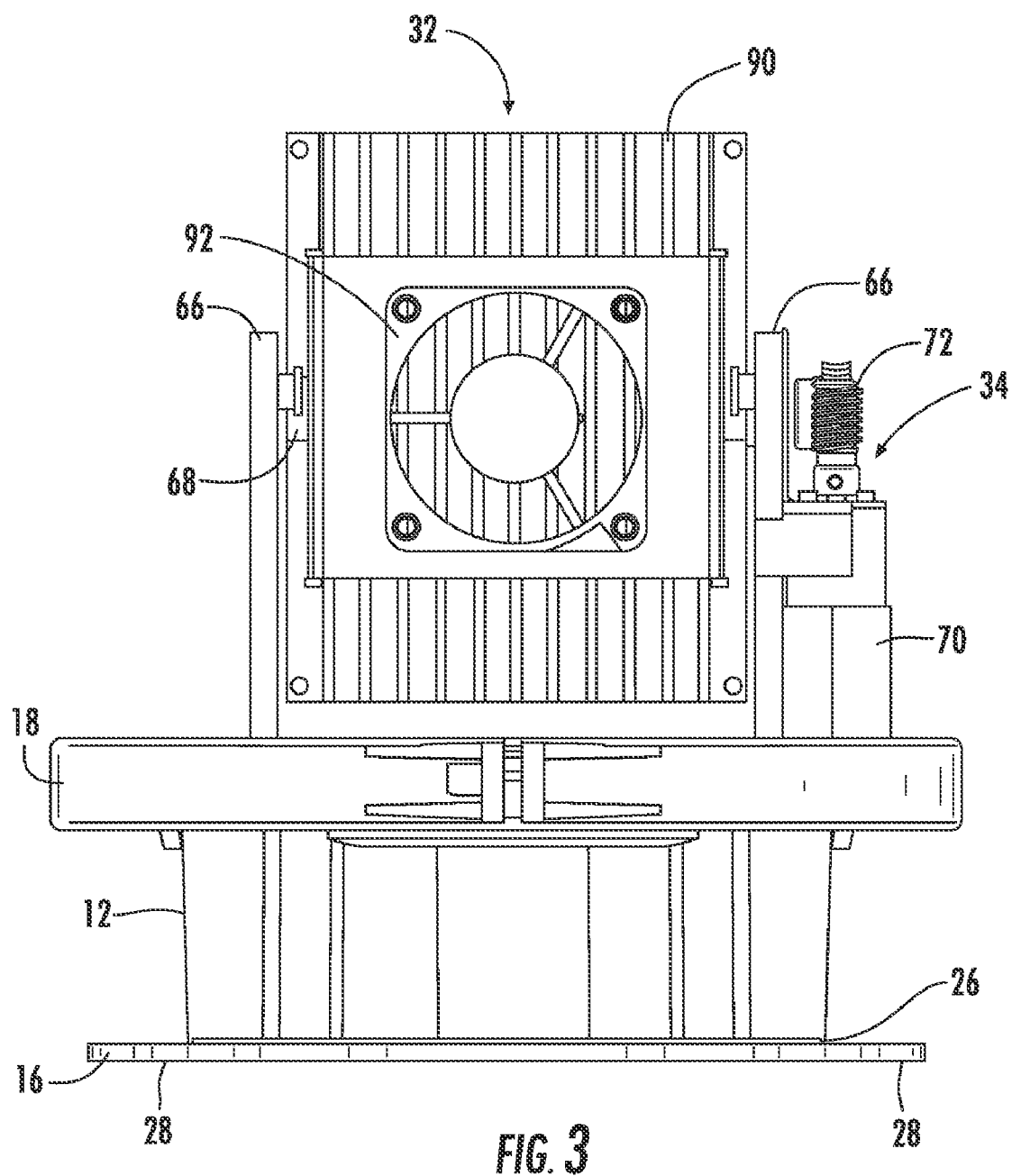
FIG. 3 is a rear plan view of the pan-tilt spotlight of FIG. 1 with the dome removed.
Figure 4:
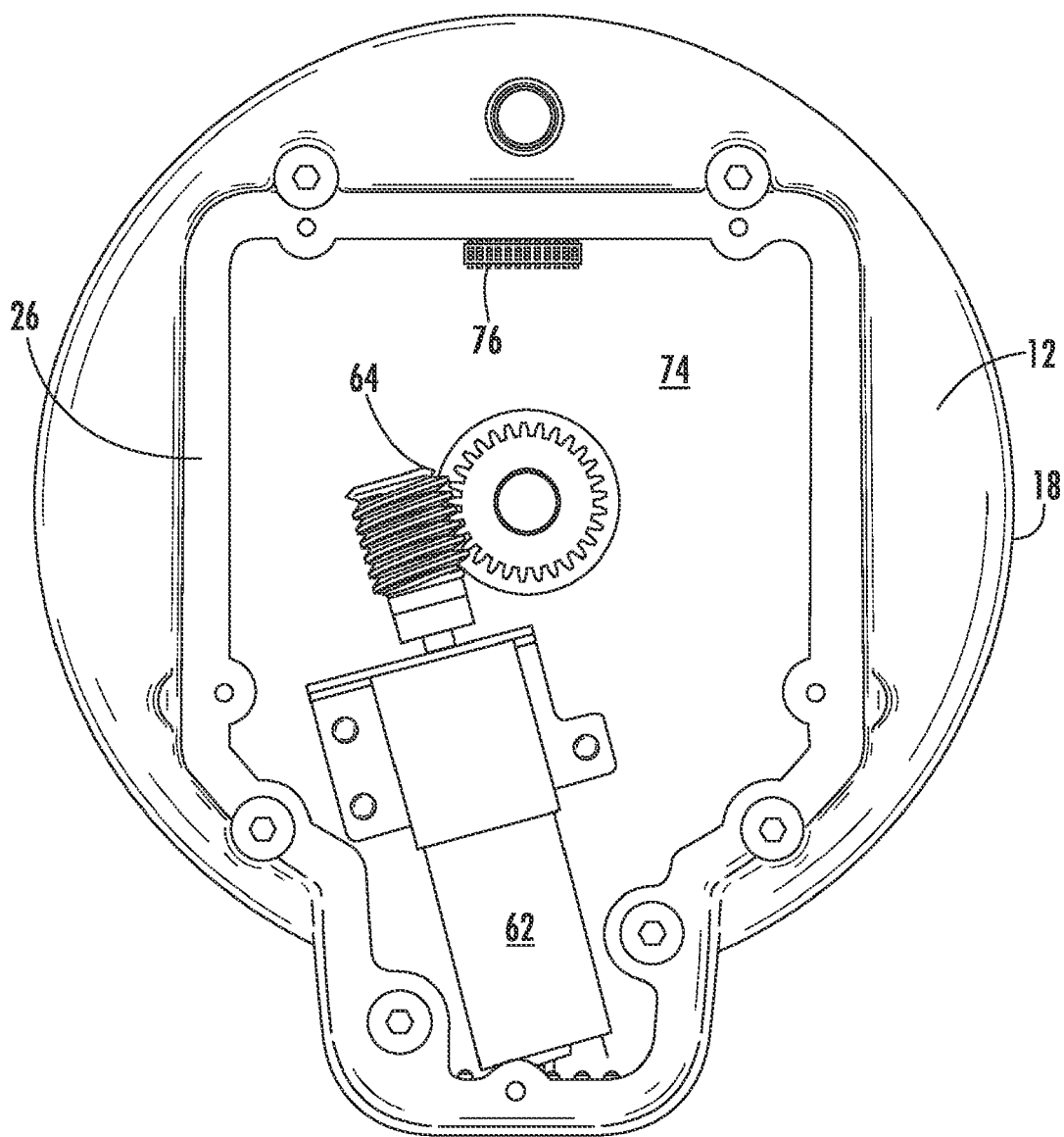
FIG. 4 is a bottom plan view of the pan-tilt spotlight of FIG. 1 with the mounting plate removed to show the pan drive motor and worm drive.
Figure 5:
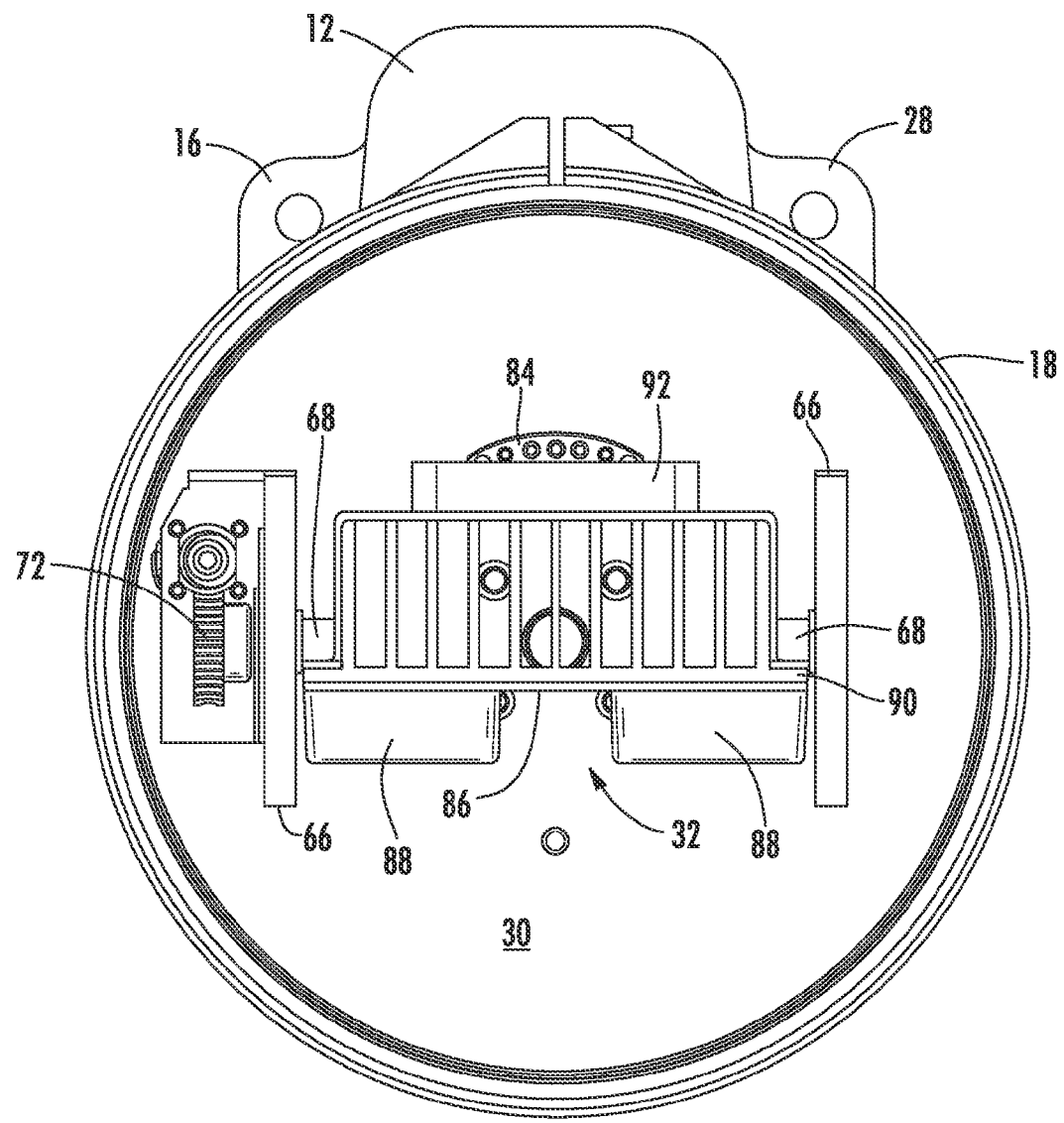
FIG. 5 is a top plan view of the pan-tilt spotlight of FIG. 1 with the dome removed.
Figure 6:
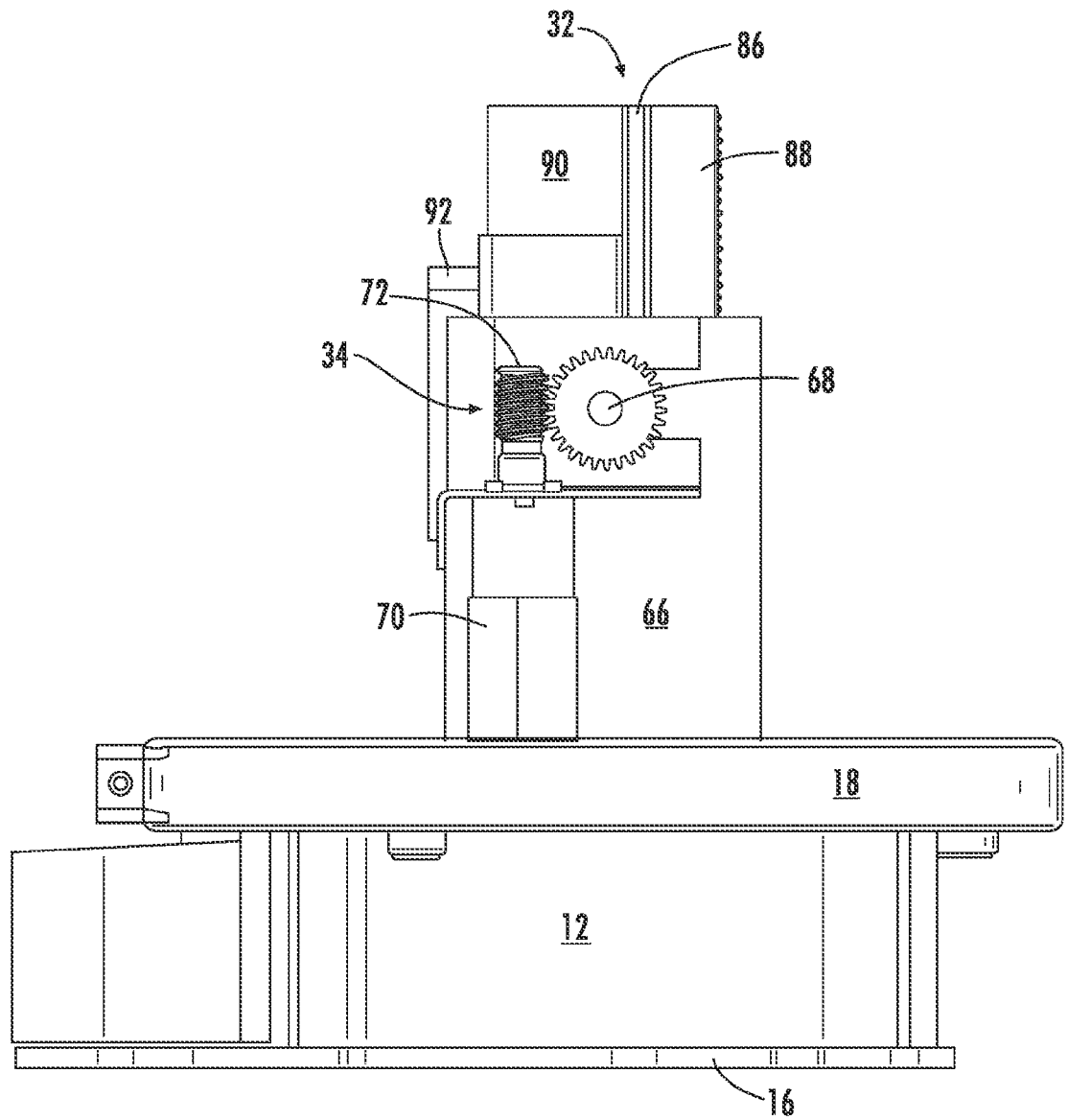
FIG. 6 is a side plan view of the pant-tilt spotlight of FIG. 1 with the dome removed, showing the tilt drive motor and worm drive.
Figure 7:
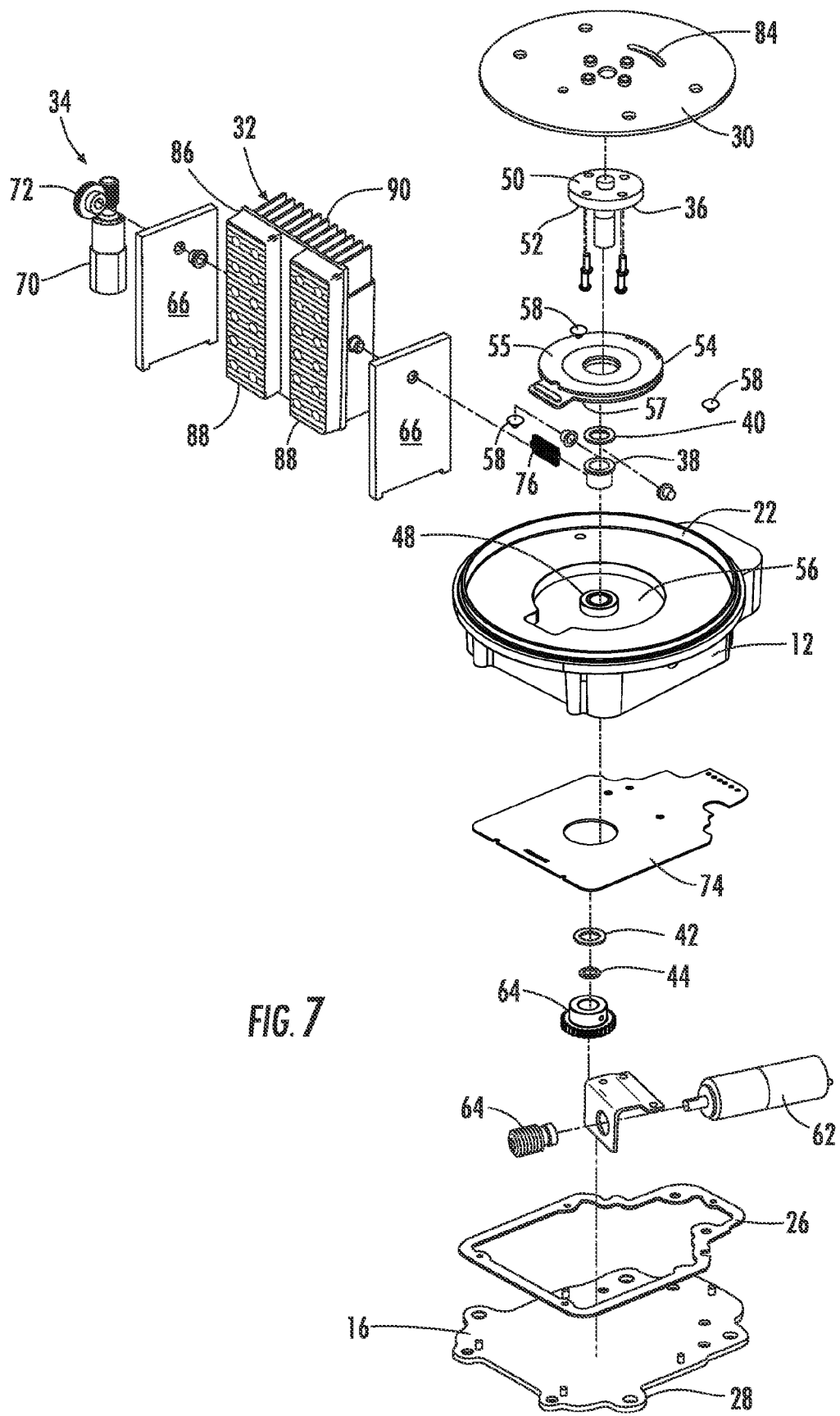
FIG. 7 is an exploded perspective view of the pan-tilt spotlight of FIG. 1, with the dome and clamp omitted.
Figure 8:
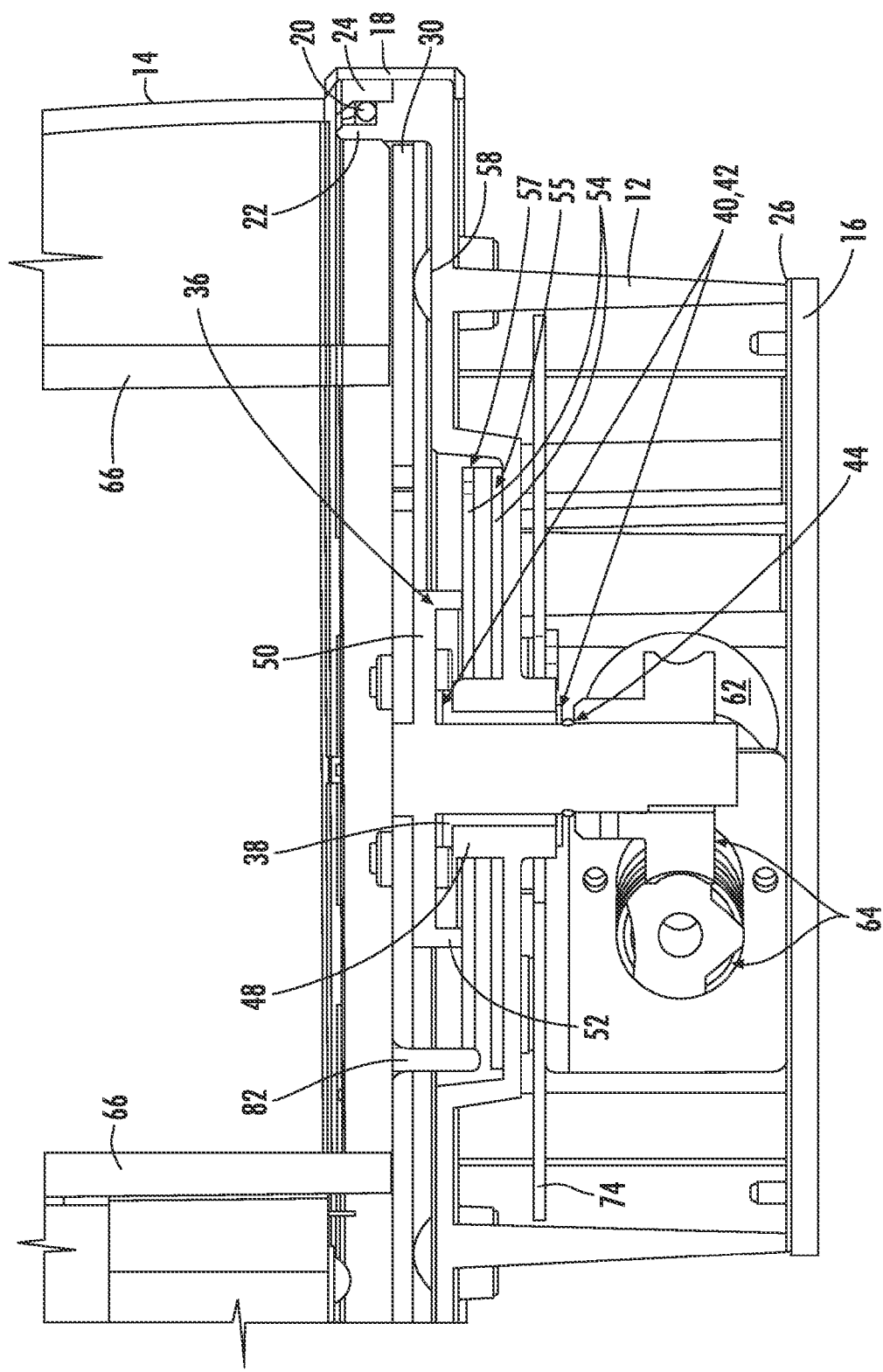
FIG. 8 is an enlarged sectional view through the base, main shaft and related subassemblies of the pan-tilt spotlight of FIG. 1.
Figure 9:
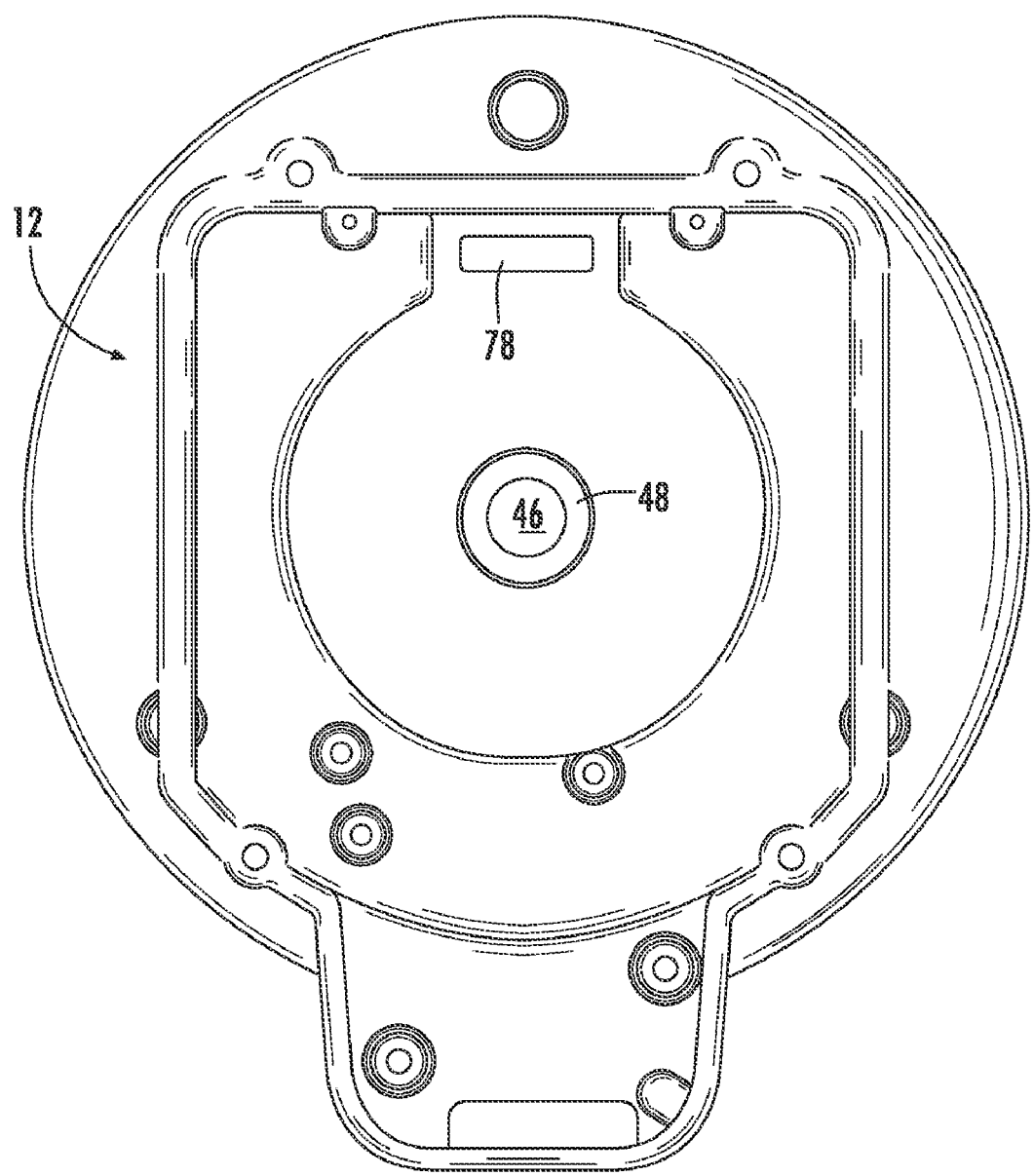
FIG. 9 is a bottom plan view of the base of the pan-tilt spotlight of FIG. 1 shown in isolation for clarity.
Figure 10:
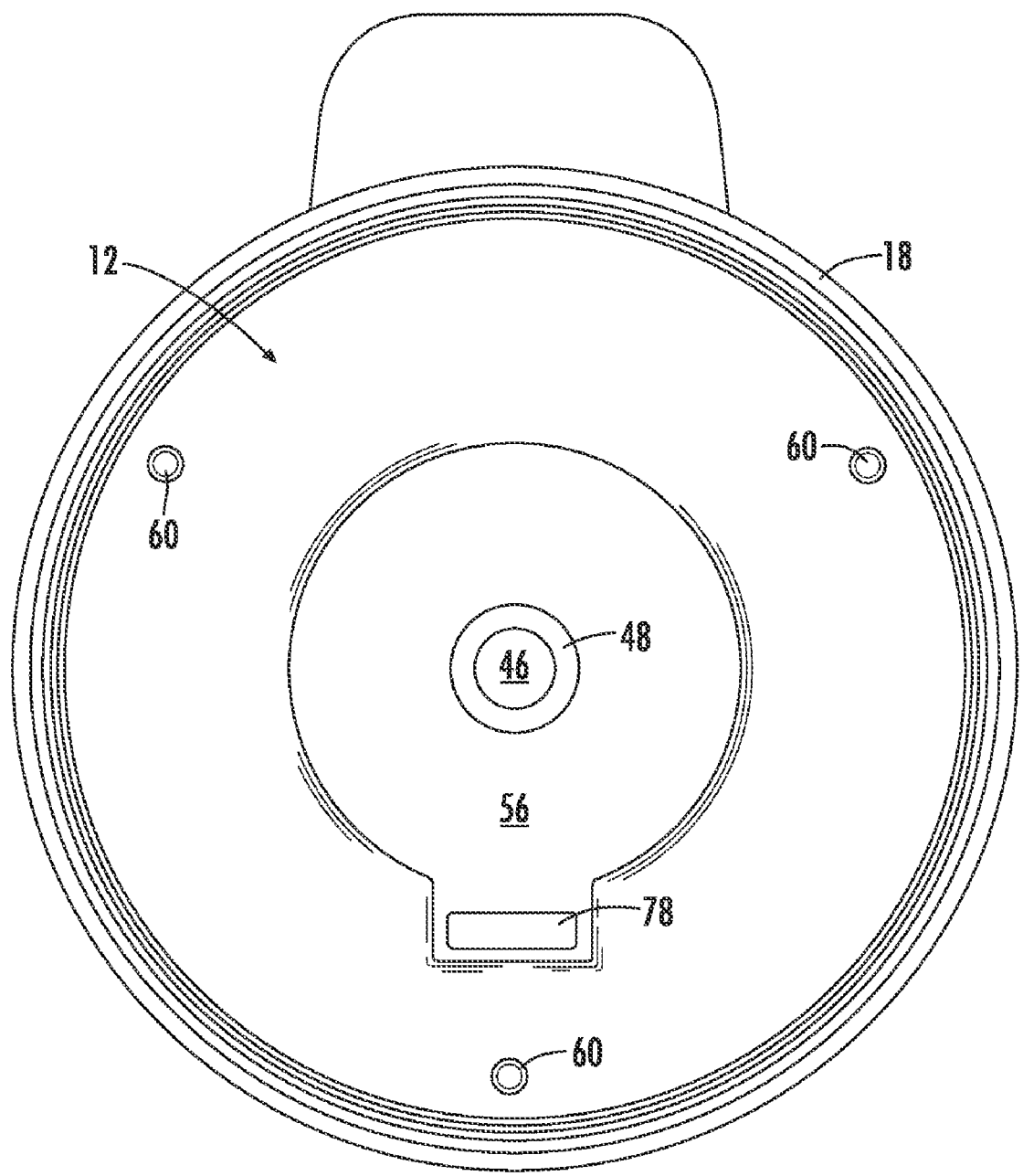
FIG. 10 is a top plan view of the base shown in FIG. 9, shown in isolation for clarity.

The disclosed spotlight 10 includes a sealed enclosure surrounding all the circuitry, moving parts and components of the spotlight. The primary housing components include a base 12, a dome 14 and a mounting plate 16. A connecting ring 18 spans the interface of the dome 14 and base 12 and tightens to lock the dome to the base as best shown in FIG. 8. An O-ring gasket 20 fits over an upstanding lip 22 of the base 12 and is compressed horizontally between a downward protruding lip 24 of the dome 14. This relationship, secured by the connecting ring 18 provides a securely engaged and sealed connection between the dome 14 and the base 12 to define an upper compartment within the spotlight 10. The dome 14 is intended to be optically transparent and may be molded from plastic material such as polycarbonate. Other dome materials, such as alternative plastics or glass, may also be suitable. The outside surface (or the entire surface) of the dome may be hard coated to improve resistance to abrasion from airborne sand, dirt, and other abrasive materials. Suitable hard coatings and application methods are known in the art.

Figure 25:
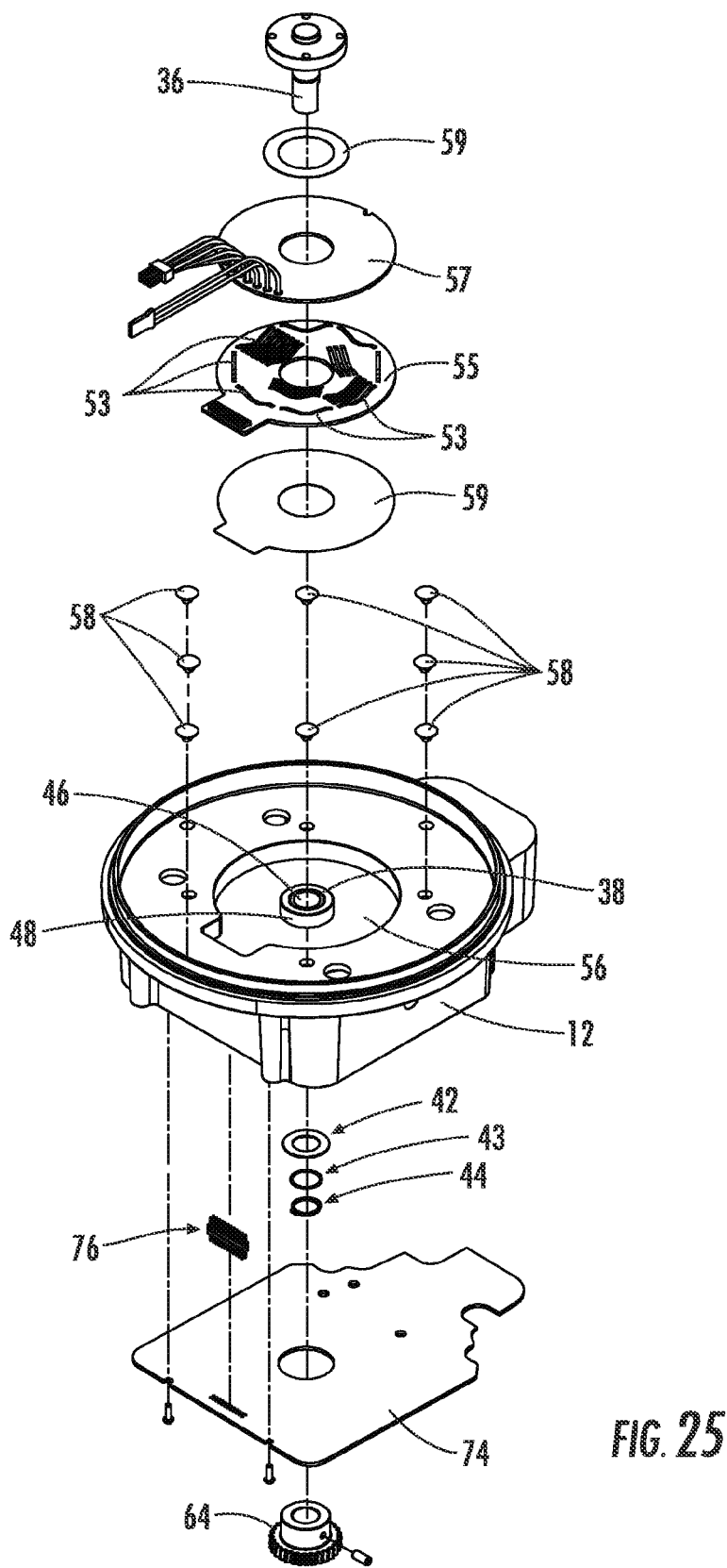
FIG. 25 is an exploded perspective view showing the base, motor control board, slip ring assembly and main shaft with drive gear.
Figure 26:
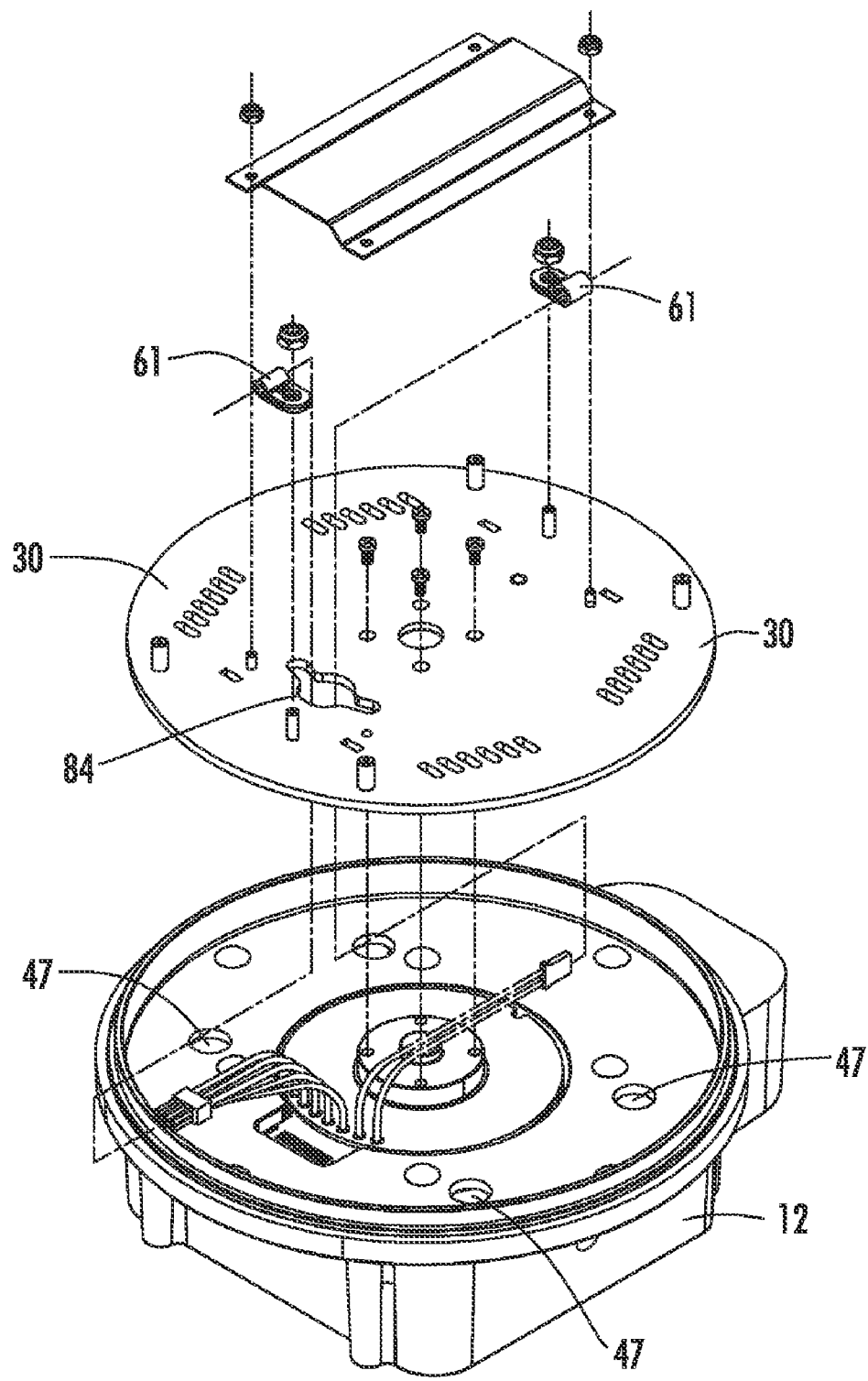
FIG. 26 is an exploded perspective view of the assembled base in conjunction with the turntable plate, wire harnesses and connectors.

The base 12 is preferably cast from metal and may be manufactured from die-cast aluminum, for example. Other base materials, including fiber reinforced plastic and other manufacturing methods are compatible with the disclosed spotlight. The base 12, best illustrated in FIGS. 7-10, 25 and 26 defines a lower compartment and apertures 46 and 78 communicating between the lower compartment and the upper compartment beneath the dome 14. Vent openings 47, as shown in FIGS. 25 and 26 may also be provided to exchange air and heat between the upper and lower compartments of the spotlight 10. The mounting plate 16 is secured to the base 12 by fasteners with a gasket seal 26 between the mounting plate 16 and the base 12. The base plate 16 includes laterally extending tabs 28 defining holes for receiving hardware for mounting the disclosed spotlight to any appropriate surface. The disclosed spotlight 10 may be mounted to a fixed location or any type of land, naval or airborne vehicle as needed. Together, the dome 14, O-ring 20, connecting ring 18, base 12, gasket 26 and base plate 16 define a sealed enclosure including upper and lower compartments protecting all the internal components and circuitry of the spotlight from the environment. Any wires or cables connected to the spotlight will pass through suitable grommets or seals to prevent penetration of contaminants including water from the ambient environment into the spotlight enclosure.

Rotating Spotlight Support

The disclosed spotlight 10 provides an operator with the ability to direct a beam of visible or infrared (IR) light generated by the spotlight over an arc of 365° in a horizontal plane (pan) and up or down (tilt) from 25° below the horizontal to 65° above the horizontal. A rotating subassembly supports a turntable plate 30 for full continuous rotation about a vertical axis. The turntable 30 is configured to support the light generator 32 and a tilt motor subassembly 34 for manipulating the light generator 32 about a horizontal axis.

As best shown in FIGS. 7-8A, 25 and 26, the rotating subassembly includes a central flanged main shaft 36, a main bushing 38, the turntable plate 30, washers 40, 42, 43 and a snap ring 44. The main bushing 38 is press fit into a central aperture 46 defined by the base 12. The central aperture 46 is surrounded by an upstanding lip 48 configured to position the bushing 38 to support the main shaft 36 and its flange 50 in a predetermined spaced relationship relative to other portions of the base 12, as will be described in further detail below. The main bushing (bearing) 38 may be a sintered bronze or other suitably durable friction-reducing material. Alternative bearings known in the art may be compatible with the disclosed configuration. An upper friction-reducing washer 40 constructed of a suitable friction-reducing material such as Delrin plastic fits between a bottom surface of the flange 50 on the main shaft 36 and an upper surface of the main bearing 38. A lower metal washer 42 engages a snap ring 44 to retain the flanged main shaft 36 in a predetermined relationship with respect to the main bearing 38 and base 12.

The alternative embodiment illustrated in FIGS. 8A, and 25-27 employs a flat washer 42 and wave spring washer 43 to pull the main shaft 36 downward against the spring pressure of the slip ring contacts 53. Eliminating components between the upstanding lip 48 of the base 12 and the bottom surface of the flange 50 of the main shaft limits the number of tolerances that must be controlled to determine the position of the main shaft 36 with respect to the base 12, which in turn determines the compressed state of the slip ring 54. Compression of the slip ring must be controlled to ensure adequate contact pressure without excess wear on the contacts.

The turntable plate 30 is secured to the flange 50 of the main shaft 36 by suitable hardware. The flange 50 of the main shaft 36 includes a downwardly extending lip 52 spaced a predetermined distance from the rotational axis of the main shaft 36 and downwardly extending a predetermined distance. This flanged configuration of the shaft 36 is constructed to engage the slip ring assembly 54 received in the pocket 56 defined by the base 12. The position of the main shaft 36 and flange 50 is selected to maintain the slip ring assembly 54 in a predetermined compressed relationship in the pocket 56. The slip ring assembly 54 is of a known construction and includes a plurality of conducting rings (not shown), each having multiple spring-biased contacts 53. The compressed relationship maintains electrical contact between the upper and lower slip rings to conduct electrical power and signals between the upper and lower compartments of the spotlight enclosure.

Employing a slip ring 54 permits the disclosed spotlight to continuously rotate (pan) about the main shaft 36. The main shaft 36 and its laterally extending flange 50 may be manufactured as a unitary part or constructed separately and secured by appropriate means to each other and to the turntable plate 30. The turntable plate 30 is constructed from suitably robust material to support the tilt subassembly and light generator 32. The turntable plate 30 may be constructed from ⅛" thick sheet aluminum, for example. To improve stability of the turntable plate 30, the disclosed spotlight 10 includes a plurality of support nodes 58, preferably symmetrically positioned about the periphery of the turntable plate 30 and arranged to engage the turntable plate 30 from below. In the disclosed configuration, nylon Fastex plugs are arranged in openings 60 defined by the base 12. The spotlight 10 shown in FIGS. 1-8, 9 and 10 includes three nylon fastex plugs 58 equiangularly arranged about the rotational axis defined by the main shaft 36. The objective of the support nodes 58 is to provide lateral stability to the turntable plate 30 while minimizing frictional drag on the turntable plate during rotation (pan).

The alternative embodiment illustrated in FIGS. 8A, and 25-27 employs non-conductive insulators 59 to prevent electrical contact between the slip rings 57, 55 and the metal main shaft 36 and base 12. FIGS. 26 and 27 illustrate cable clamps 61 and a shield 63 are employed to control and protect groups of wires extending from the upper slip ring 57 through the turntable plate 30 to the tilt subassembly and light generator 32. Controlling movement of the groups of wires and providing adequate wire loop length prevent chafing of insulation and fatigue in the conductors from excessive strain during pan and tilt movement of the spotlight. FIGS. 26 and 27 also illustrate vent holes 65 in the turntable plate 30 to facilitate exchange of air between the upper and lower compartments of the spotlight 10. The vent holes 65 in the turntable plate are positioned to pass over the vent openings 47 defined by the base 12 and not the support nodes 58 described below. FIG. 27 illustrates a shroud 67 configured to surround the light generator 32 and support a fan 92 to cool the light generator 32.

Circulating air inside the spotlight 10 and allowing air to exchange between the upper and lower compartments of the spotlight spreads heat throughout the spotlight and allows heat to be radiated from the entire assembly to prevent hot spots and enhance cooling efficiency.

The alternative embodiment illustrated in FIGS. 8A, and 25-27 employs eight support nodes 58 arranged in two concentric patterns best seen in FIG. 25. The concentric patterns of support nodes 58 and vent holes 65 in the turntable plate 30 are arranged so that the vent holes do not pass over the support nodes 58. The eight support nodes 58 are arranged to provide substantial support to the turntable plate 30 and absorb most of the vertical and lateral forces that would otherwise be delivered to the main shaft 36. The support nodes 58 are dome shaped and constructed of material having relatively low friction and good wear properties. The domed configuration limits the surface area of the node in contact with the bottom of the turntable plate. Other support node configurations consistent with these properties are compatible with the disclosed spotlight embodiments.

The rotating subassembly is driven by a DC motor 62 equipped with a worm gear 64. Any motor having suitable torque may be compatible with the disclosed spotlight 10. The pan motor 62 included in the disclosed spotlight is a planetary drive motor selected for its high torque and compact size. The selected worm gear final drive 64 permits further gear reduction to ensure sufficient torque necessary to overcome friction in the rotating subassembly. The disclosed worm drive 64 permits a gear reduction of approximately 40 to 1 in the final drive. The final drive gears 64 are of suitably durable material, such as stainless steel, bronze or the like. Grease, dry film or other suitable lubricants may be used to reduce friction in the final drive 64 for the rotating subassembly. Control of the motors for the pan and tilt functions of the spotlight will be described separately.

Light Shields

Figure 12:
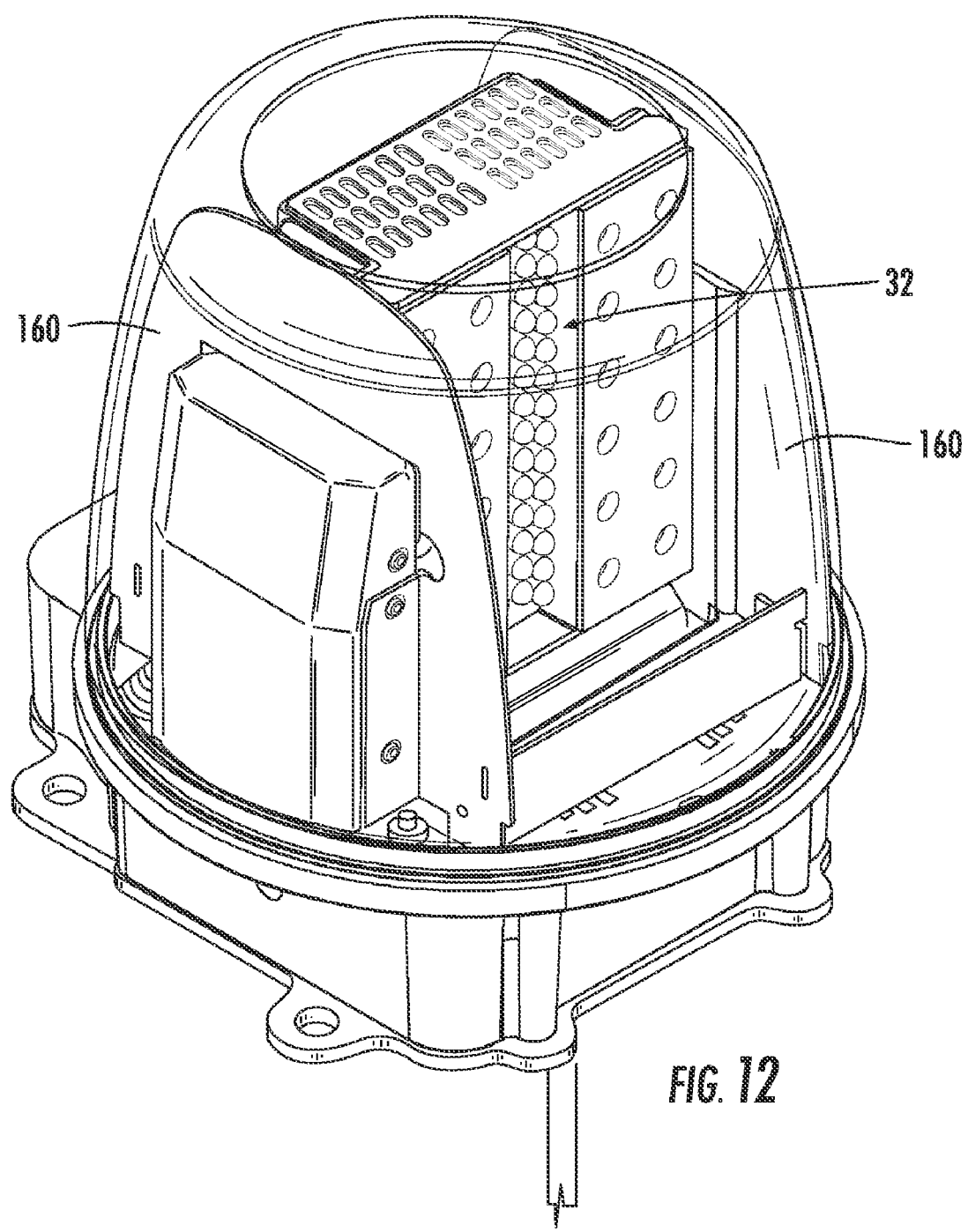
FIG. 12 is a perspective view of an alternative embodiment of the disclosed pan-tilt spotlight.
Figure 13:
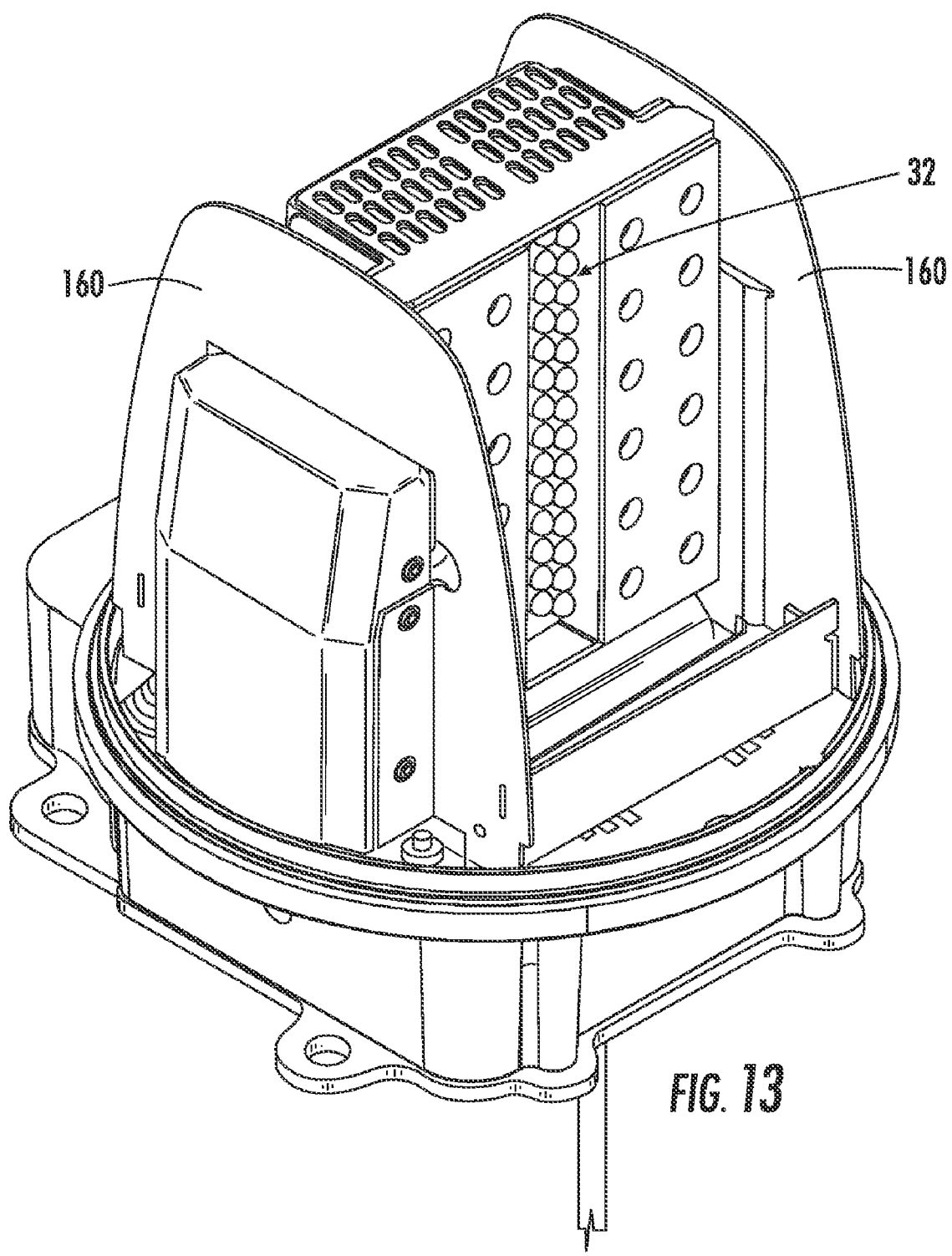
FIG. 13 is a perspective view of the pan-tilt spotlight of FIG. 12, with the dome removed for clarity.
Figure 14:
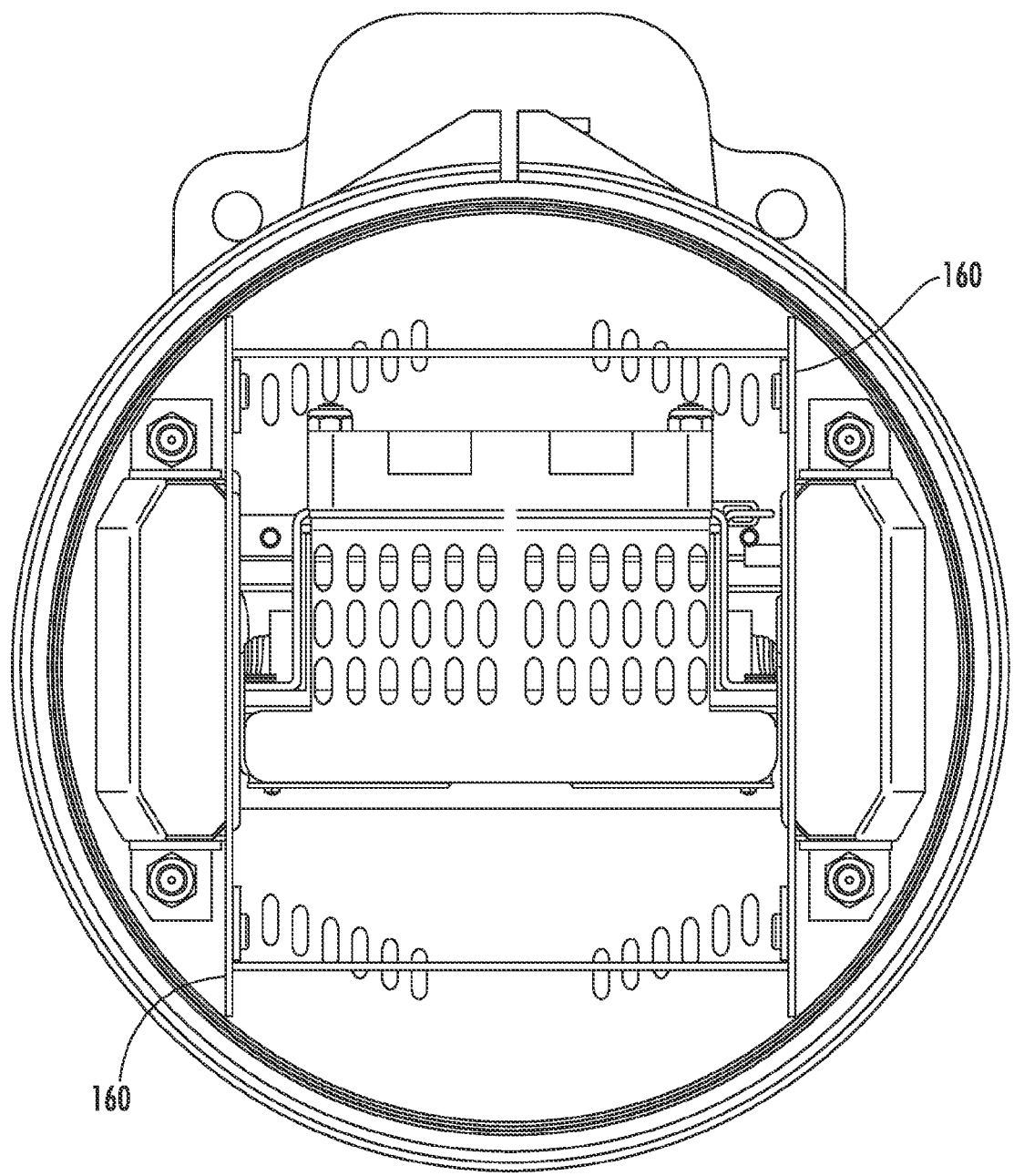
FIG. 14 is a top plan view of the pan tilt spotlight of FIG. 12 with the dome removed for clarity.
Figure 15:
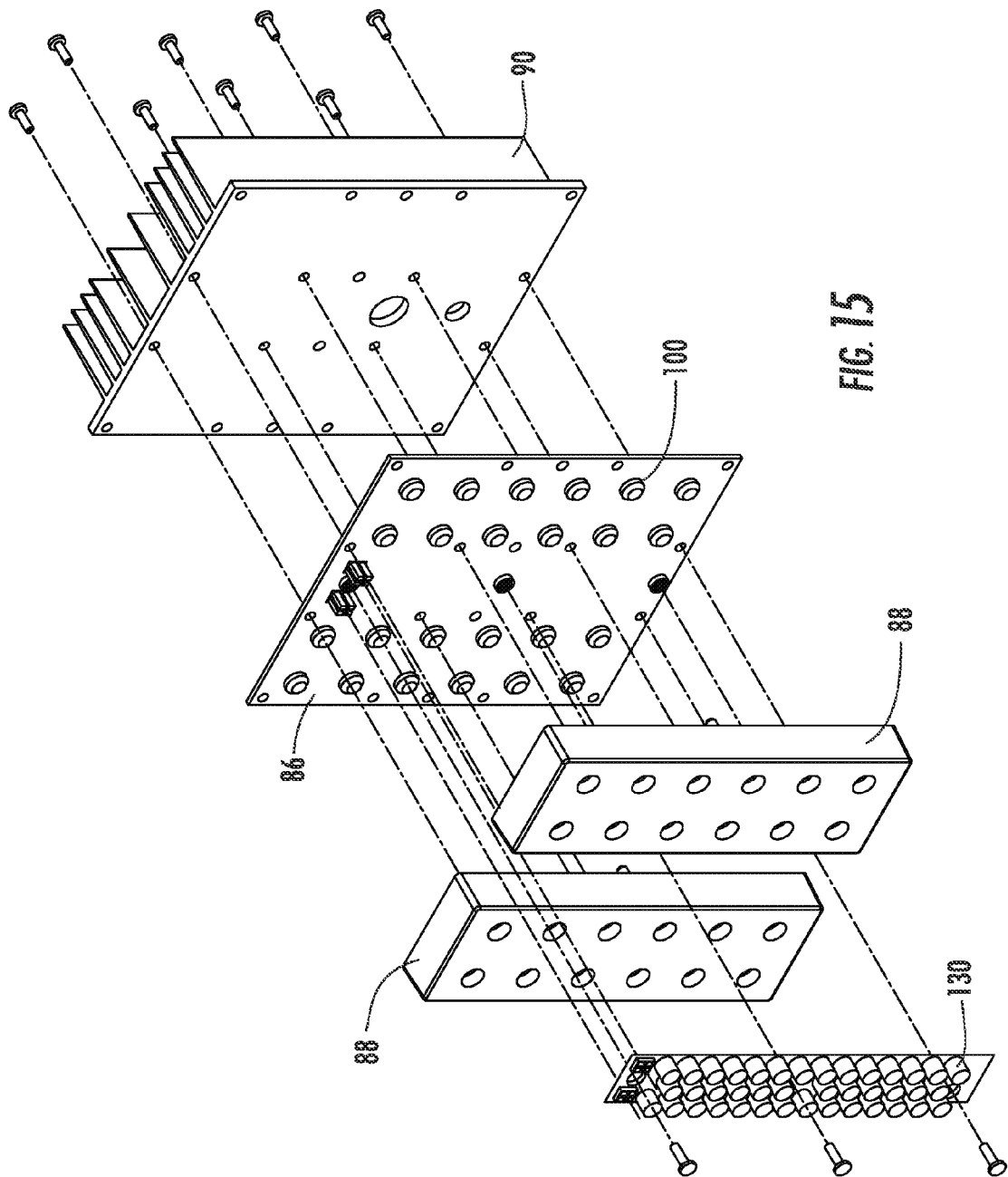
FIG. 15 is a perspective exploded view of a light generator sub-assembly compatible with the disclosed spotlight embodiments.

The spotlight 10 may be used in conjunction with military vehicles where remaining undetected is a priority. FIGS. 12-14 illustrate light shields 160 on either side of the light generator 32 whose function is to reduce back reflection of light from the light generator off the inside surface of the dome 14. The light shields 160 are configured to closely conform to the inside surface of the dome 14, without touching during rotation of the spotlight. The light shields 160 interrupt light reflected inside the dome and reduce visibility of the spotlight in use. The light shields may be constructed of any suitable material and may be coated with light absorbing materials to increase the effect.

Tilt Subassembly

The tilt subassembly generally includes a pair of vertical supports 66, horizontal stub shafts 68 secured to the light generator 32, and a tilt motor 70 and worm drive 72. The vertical supports 66 are rigidly connected to the rotating turntable plate 30. The connection between each vertical support 66 and the turntable plate 30 will be suitably robust to maintain a perpendicular relationship between the vertical supports 66 and the turntable plate 30 over a variety of vibration and impact scenarios. The motor selected for the tilt function is a reversible DC motor having suitable torque. The motor 70 employed in the disclosed spotlight 10 is a planetary drive motor equipped with a worm final drive 72 as shown in FIGS. 2, 3, 5 and 6. The planetary and worm drives provide suitable gear reduction to obtain the necessary torque. The final worm drive 72 gears are constructed of suitably robust materials, such as stainless steel or bronze or the like. A worm drive 72 is advantageous as it prevents forces applied to the movable light generator 32 from back-driving through the drive to the motor 70. In other words, forces applied to the light generator 32 by impact or vibration do not apply rotation forces to the motor 70. Suitable mechanical and/or electrical limits will define the up/down (tilt) movement provided by the tilt subassembly.

The disclosed spotlight is configured to provide a 90° arc of up/down movement from 25° below the horizontal to 65° above the horizontal. The vertical supports 66 include bearings for receiving the horizontal stub shafts 68. The bearings are selected from suitable material, such as sintered bronze. The vertical supports 66 are constructed of appropriately robust material, such as aluminum plates or bent sheet metal. FIG. 27 illustrates an exemplary configuration of supports 66 constructed of bent sheet metal and secured over threaded studs 69 extending upwardly from the turntable plate 30. A cam 71 is arranged to actuate limit switches 73, 75 to define the limits of movement of the light generator 32 about the horizontal axis defined by the shafts 68. Signals from the switches 73, 75 pass through the slip ring to the motor control board 74, where the controller 80 employs these signals to control movement of the tilt subassembly. The tilt motor 70 and drive components are secured to the vertical support opposite the cam 71.

Control Interface

Figure 11:
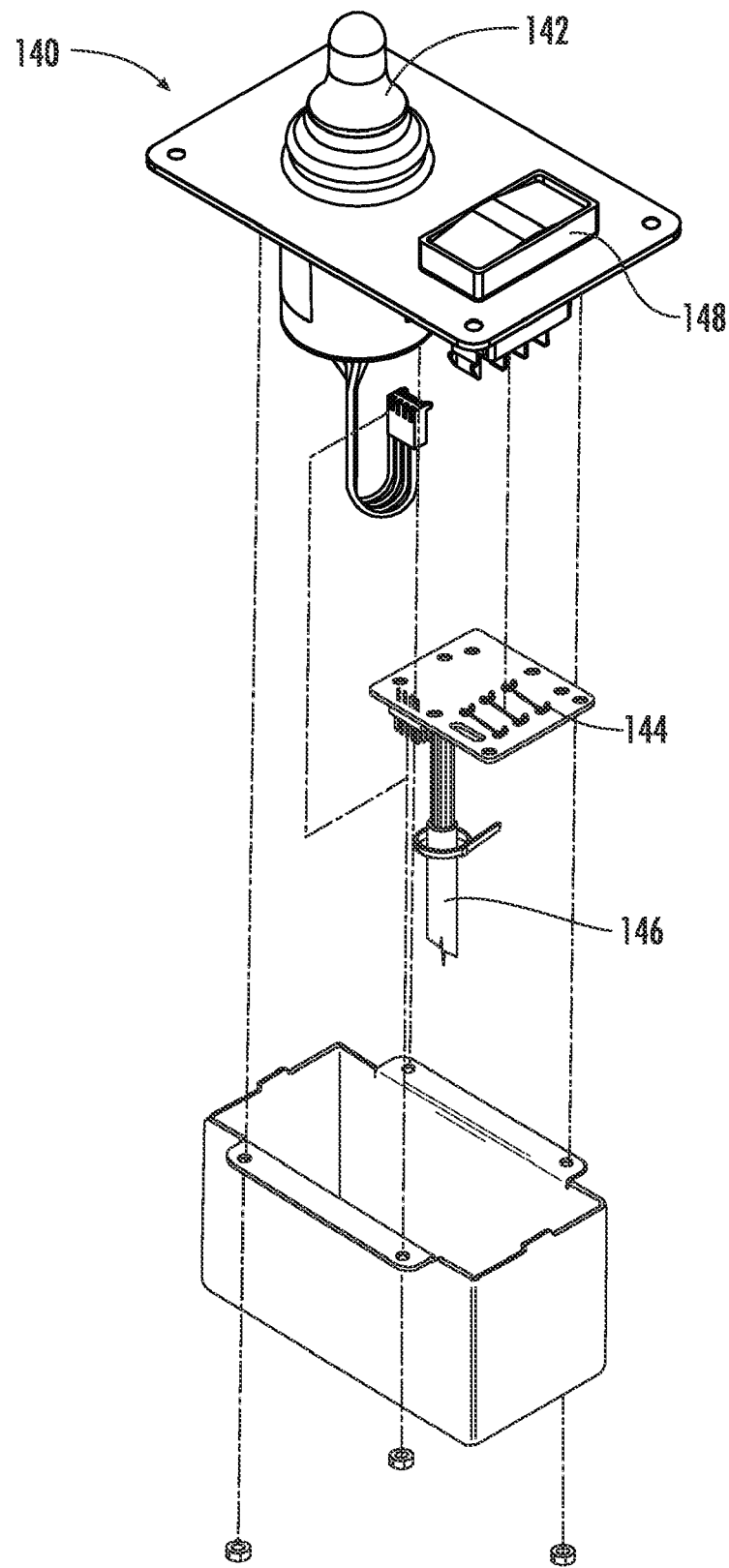
FIG. 11 is an exploded perspective view of an exemplary control interface assembly compatible with the disclosed spotlight embodiments.
Figure 21A:
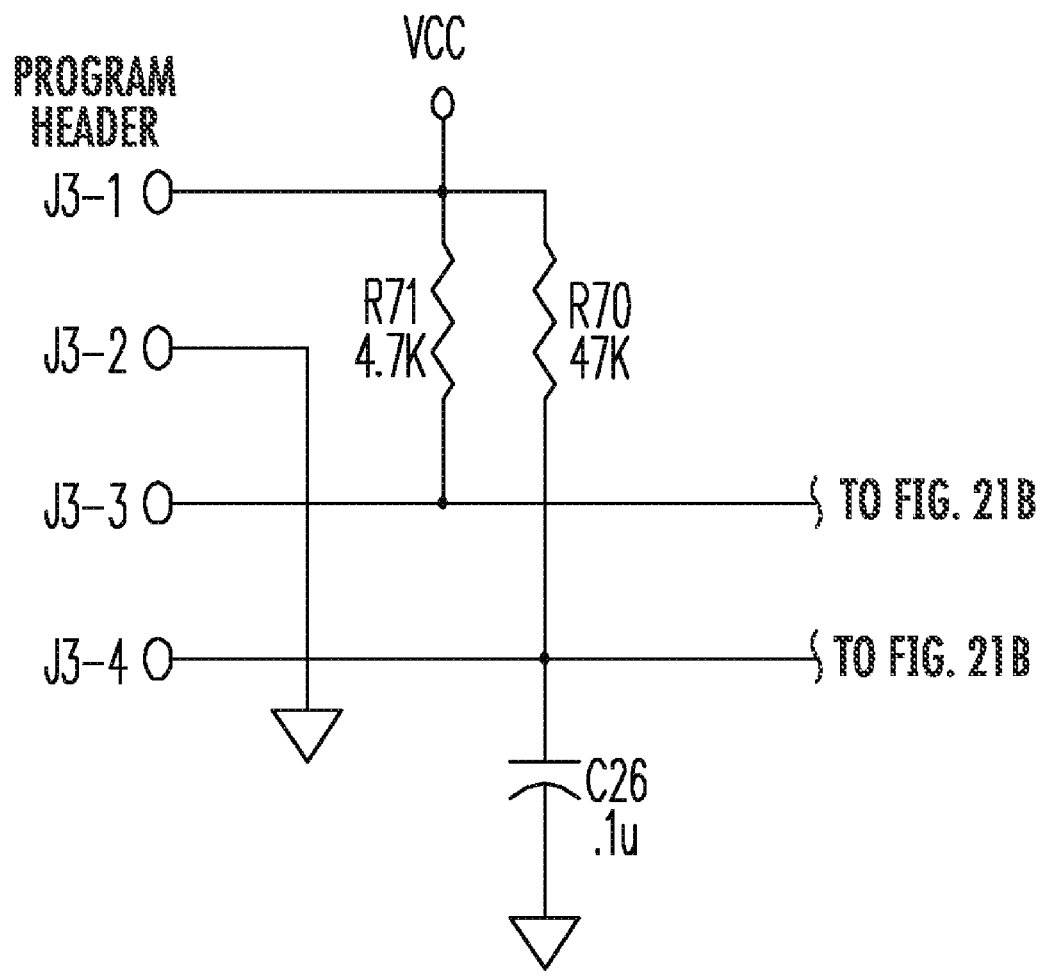
FIG. 21 is a partial schematic of an exemplary control circuit and microcontroller compatible with the disclosed spotlight embodiments.
Figure 21B:
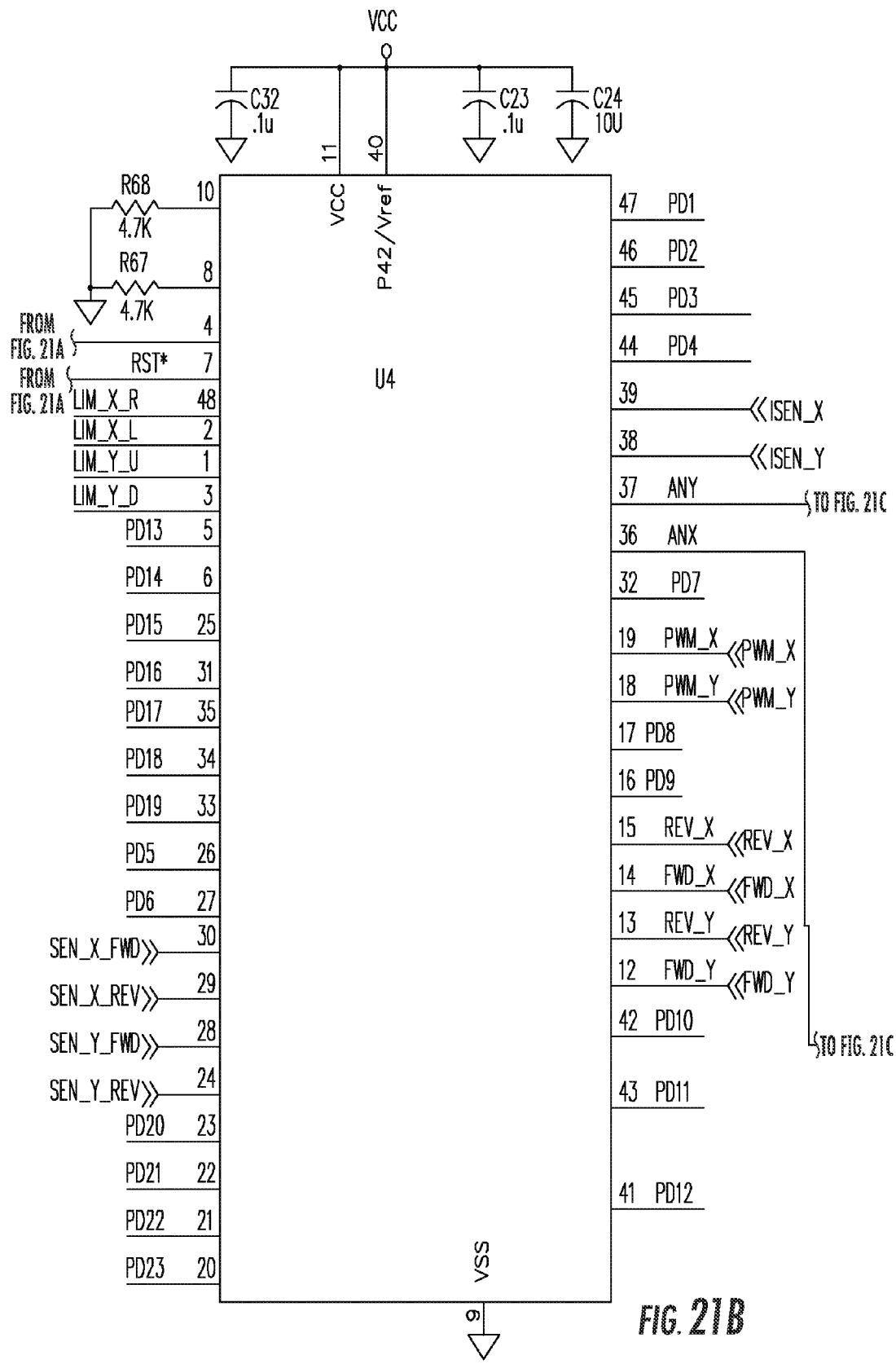
Figure 22:
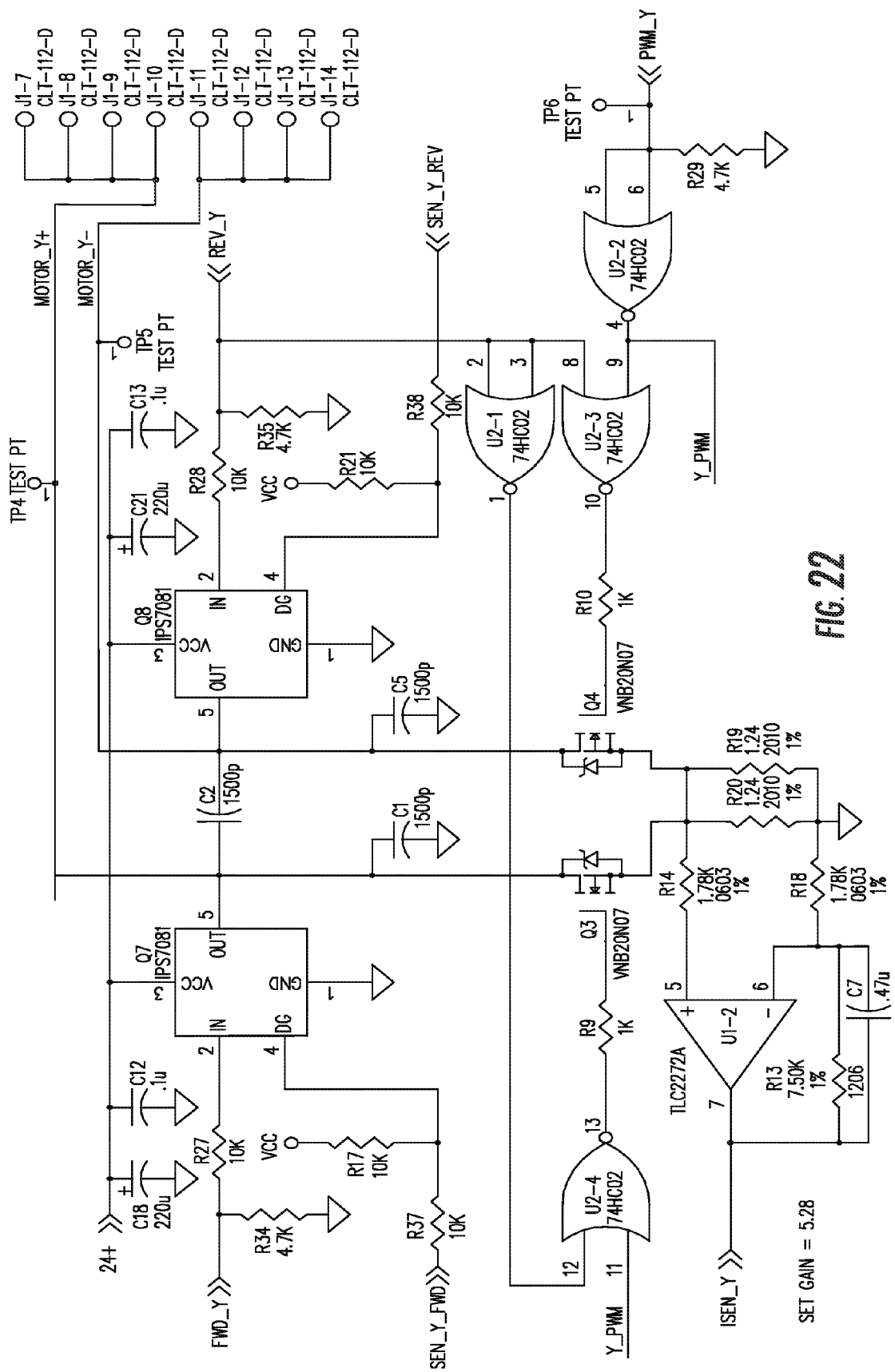
FIG. 22 is a schematic of an exemplary tilt motor control circuit compatible with the disclosed spotlight embodiments and cooperative with the control circuit of FIG. 21.
Figure 23:
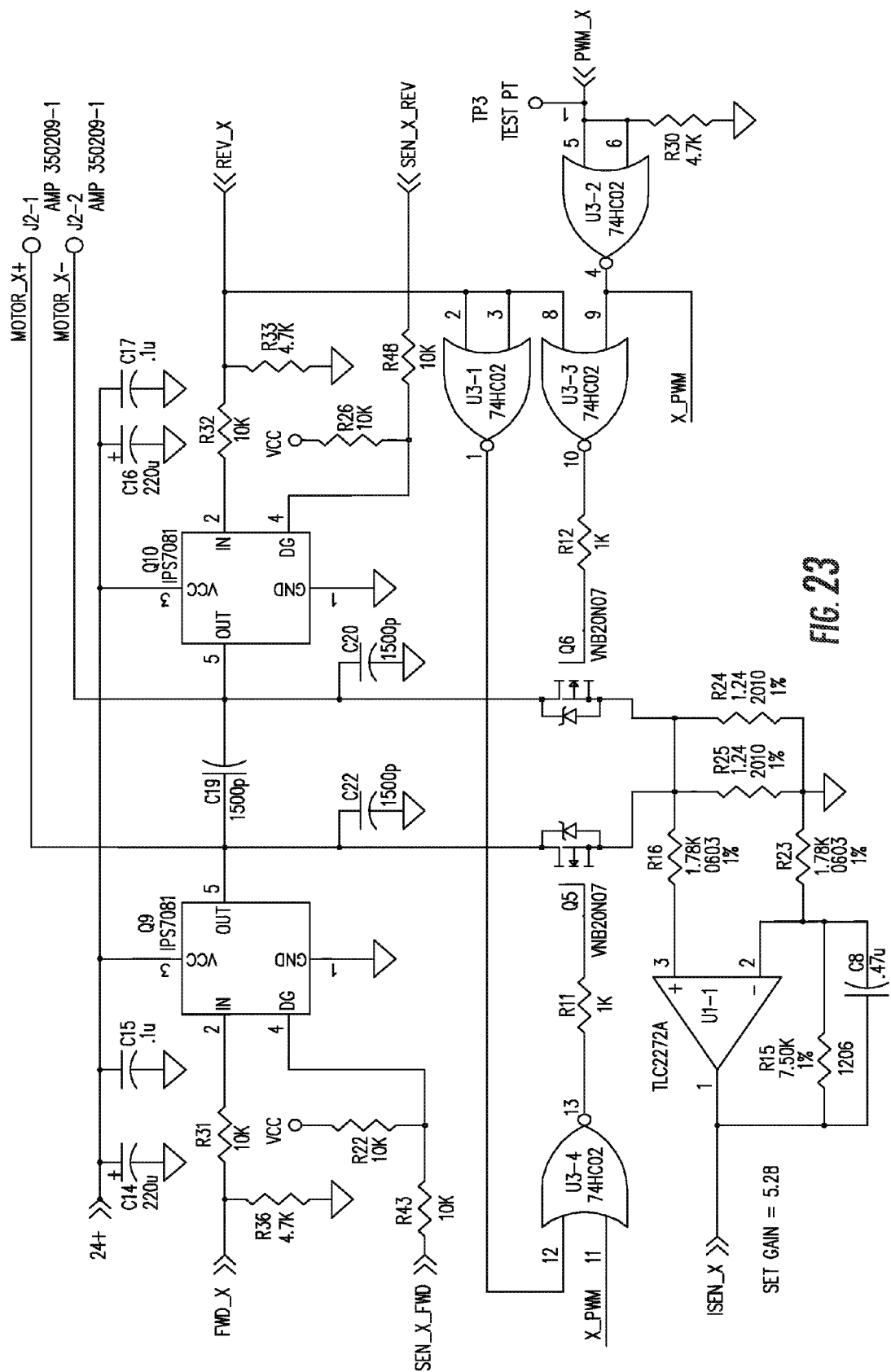
FIG. 23 is a schematic of an exemplary pan motor control circuit compatible with the disclosed spotlight embodiments and cooperative with the control circuit of FIG. 21.
Figure 24:
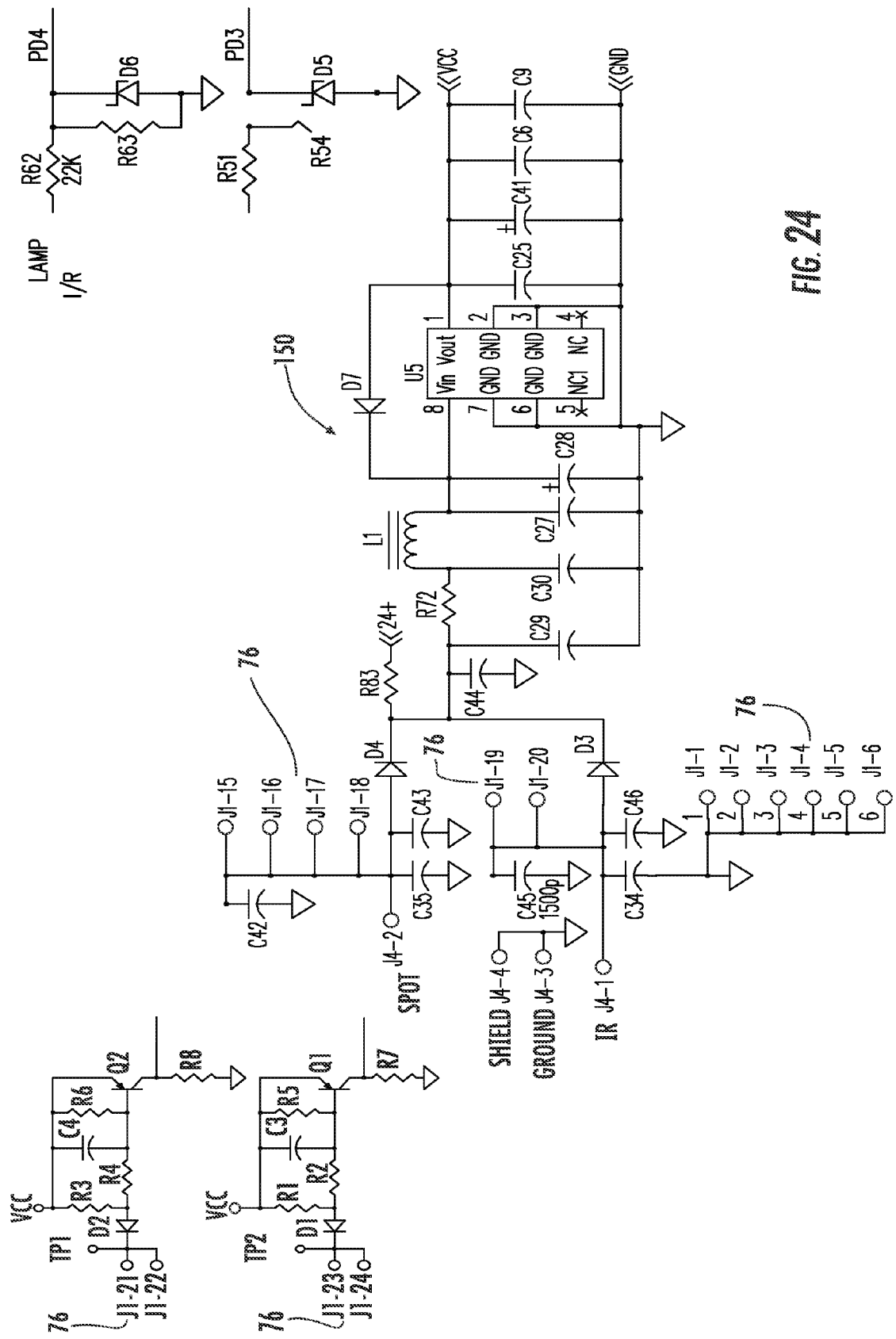
FIG. 24 is a schematic of circuits on the motor control board, some of which are connected through the slip ring assembly to the light generator PC board of FIG. 16 and to retrieve tilt limit signals.

FIG. 11 illustrates an exemplary control interface 140 compatible with the disclosed spotlight embodiments. A joystick 142 provides outputs that vary with the degree of deflection exerted by the operator. These signals are delivered to the PC board 144, where they are amplified by the constant current drivers illustrated in FIG. 20 and sent along the cable 146 to the motor control board 74 and controller 80. The PAN and TILT signals from the control interface 140 are delivered to the controller 80 as shown in FIG. 21. A switch 148 allows alternative activation of visible (white) light or IR from the light generator 32. The selected light generator signal is delivered to the light generator PC board 86 via the motor control board 74 and slip ring 54. FIG. 24 illustrates circuits on the motor control board that distribute the SPOT (white) or IR signals through the slip ring 54 by way of connector 76. FIG. 24 also includes a voltage regulator 150 to provide power to the controller 80 and other ICs as needed.

Motor Control

The pan and tilt motors 62, 70 in the disclosed spotlight 10 are 12-volt DC reversible motors with planetary drives. Motor control electronics are included on a motor control board 74 disposed in the compartment defined in the bottom of the base 12. The motor control board 74 also serves some power distribution functions as will be described. The motor control board 74 includes a connector 76 which extends upwardly through an opening 78 defined by the base 12 to the lower slip ring 55. A suitable microcontroller 80 is programmed to employ PWM to drive the DC motors 62, 70 at variable speeds and torques in forward and reverse. Back EMF sensing during PWM off periods is employed to determine motor speed as is known in the art.

The motors are profiled over a range of temperatures, loads and other conditions to provide baseline data for the microcontroller firmware. The measured data will typically be employed in a look up table referenced by the firmware. For example, if back EMF sensing indicates that one of the motors is not moving at the desired speed, the microcontroller 80 will adjust the applied power through the PWM signal to increase or decrease the applied power and thereby adjust the speed appropriately. The microcontroller 80 receives input signals from a remote joystick as illustrated in FIGS. 11 and 20. The microcontroller is programmed to correlate greater deflection of the joystick with increased power applied to the respective motor, thereby providing variable speed pan and tilt movement. Position-related outputs from the joystick are translated by the microcontroller 80 into corresponding PWM_X (forward), X_PWM (reverse), PWM_Y (forward) and Y_PWM (reverse) signals delivered to the respective pan and tilt motors.

FIGS. 20-23 illustrate representative schematics for the motor control function. Microcontroller output signals FWD_X, REV_X, (pan) FWD_Y, and REV_Y (tilt) turn on the respective motors field effect transistors (FET) Q5, Q6, Q3, and Q4. PWM output signals PWM_X and PWM_Y from the microcontroller 80 intermittently apply vehicle voltage (24VDC) to the motors to create a PWM power signal through the respective FET. The PWM signal duty cycle is varied in response to inputs from the joystick and feedback from the motors to apply variable power to the motors 62, 70, thereby providing variable speed pan and tilt functionality. Back EMF SEN_X and SEN_Y signals are generated at sense resistors R24, R25, (pan motor 62), and R19, R20 (tilt motor 70), allowing the microcontroller 80 to sense and adjust the speed of pan/tilt movement of the spotlight. SEN_X_FWD, SEN_X_REV, SEN_Y_FWD and SEN_Y_REV are overcurrent inputs to the microcontroller 80, employed to prevent application of excessive current to the motors 62, 70.

By turning off the PWM signal (PWM_X, PWM_Y) to a respective motor 62, 70 and then turning on both FETS associated with that motor, the motor is forced to stop (braked) by removing all EMF from the motor coils. This arrangement improves the ability of the operator to precisely position the light generator 32. The previously discussed worm drives maintain the generator in the selected position by preventing back-driving of the motors.

Slip Ring Subassembly

The disclosed spotlight 10 employs a slip ring 54 to transmit power and electrical signals between the upper and lower compartments of the spotlight 10. The slip ring 54 allows the disclosed spotlight 10 to continuously pan about a vertical axis of rotation defined by the main shaft 36. The disclosed slip ring 54 is manufacture by the Sibley Company of Haddam, Conn. The slip ring 54 delivers drive signals to the tilt motor and retrieves back EMF signal SEN_Y from the tilt motor to the lower compartment of the spotlight 10 for use by the motor control function. Signals from limit switches 73, 75 are also sent through the slip ring contacts 53 for use by the motor control function, as shown in FIG. 24 (upper left). The slip ring 54 also delivers power to the upper compartment for use by the cooling fan 92 light generator 32, which will be discussed in greater detail below.

As best illustrated in FIGS. 7-10 and 25, the base 12 defines a pocket 56 configured to receive the slip ring 54 assembly. The slip ring assembly 54 includes upper and lower slip rings 55, 57 with a plurality of concentric conductors and corresponding sliding electrical contacts 53. The slip ring 54 is intended to operate under a predetermined compression to maintain the sliding contacts in electrical contact with the concentric conducting rings, thereby providing reliable electrical continuity through the slip ring 54. The lower slip ring 57 is received in the pocket 56 defined by the base 12 and electrically connected to the motor control board 74 in the bottom compartment of the base 12. An electrical connector 76 extends from the motor control board 74 up through an opening 78 defined by the base 12 to the lower slip ring 57. The base includes an upstanding central bearing support 48 configured to support the main bearing 38 and shaft 36 in a predetermined relationship with respect to the base 12.

The pocket 56, electrical connector 76 and central bearing support 48 serve to locate the bottom slip ring 57 in a substantially fixed position with respect to the base 12. The upper slip ring 55 also fits over the central bearing support 48 and is indexed with respect to the turntable plate 30 by a downwardly protruding stud 82 as shown in FIG. 8. Electrical conductors (wires) from the upper slip ring 55 extend upwardly through an arcuate opening 84 in the turntable plate 30 into the upper compartment of the spotlight for delivery of power and electrical signals to and from the light generator 32, tilt motor 70 and limit switches 73, 75. As best seen in FIGS. 8 and 8A, the downwardly extending lip 52 at the periphery of the main shaft flange 50 exerts a downward force at approximately the midpoint of the upper slip ring 55. The main shaft 36 and flange 50 are positioned in a predetermined spaced relationship with respect to the pocket 56 defined by the base 12 to maintain the slip ring 54 in a specified compressed relationship.

Light Generator

Figure 16A:
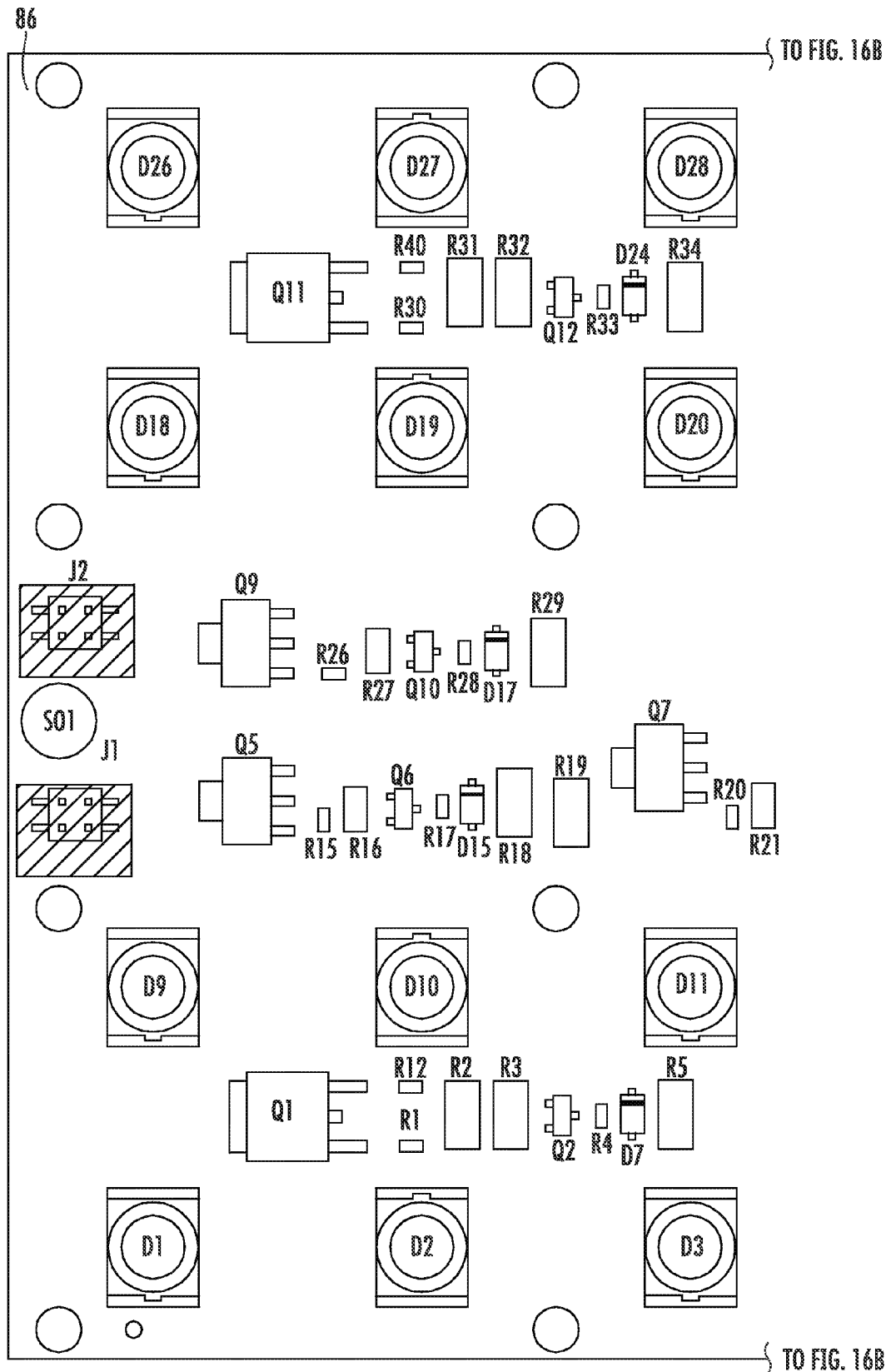
FIG. 16 is a plan view of the PC board layout for the white light generator and current sources compatible with the disclosed spotlight embodiments.
Figure 16B:
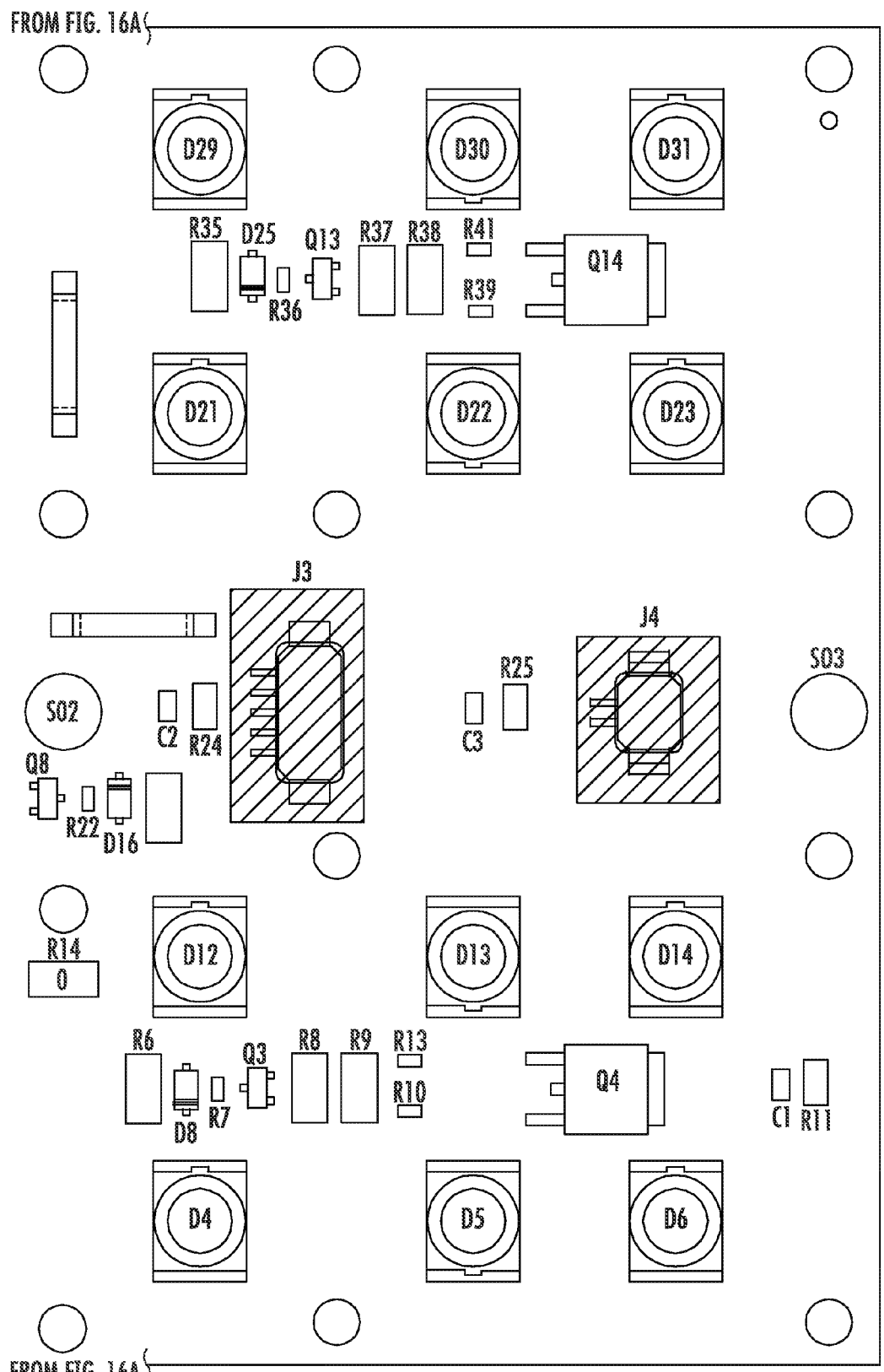
Figure 17A:
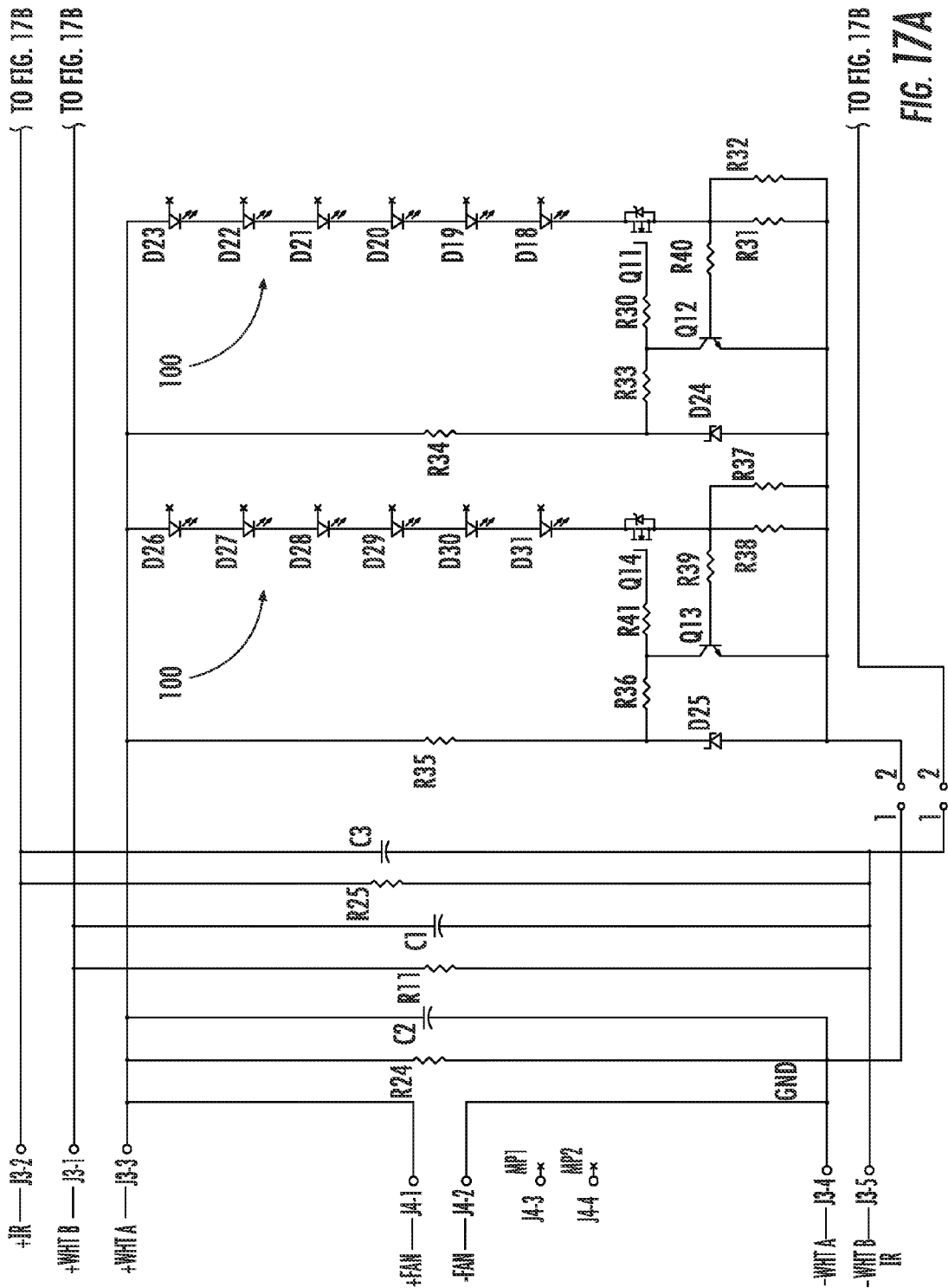
FIGS. 17A-17C are a schematic drawing of the circuit mounted to the PC board shown in FIG. 16.
Figure 17B:
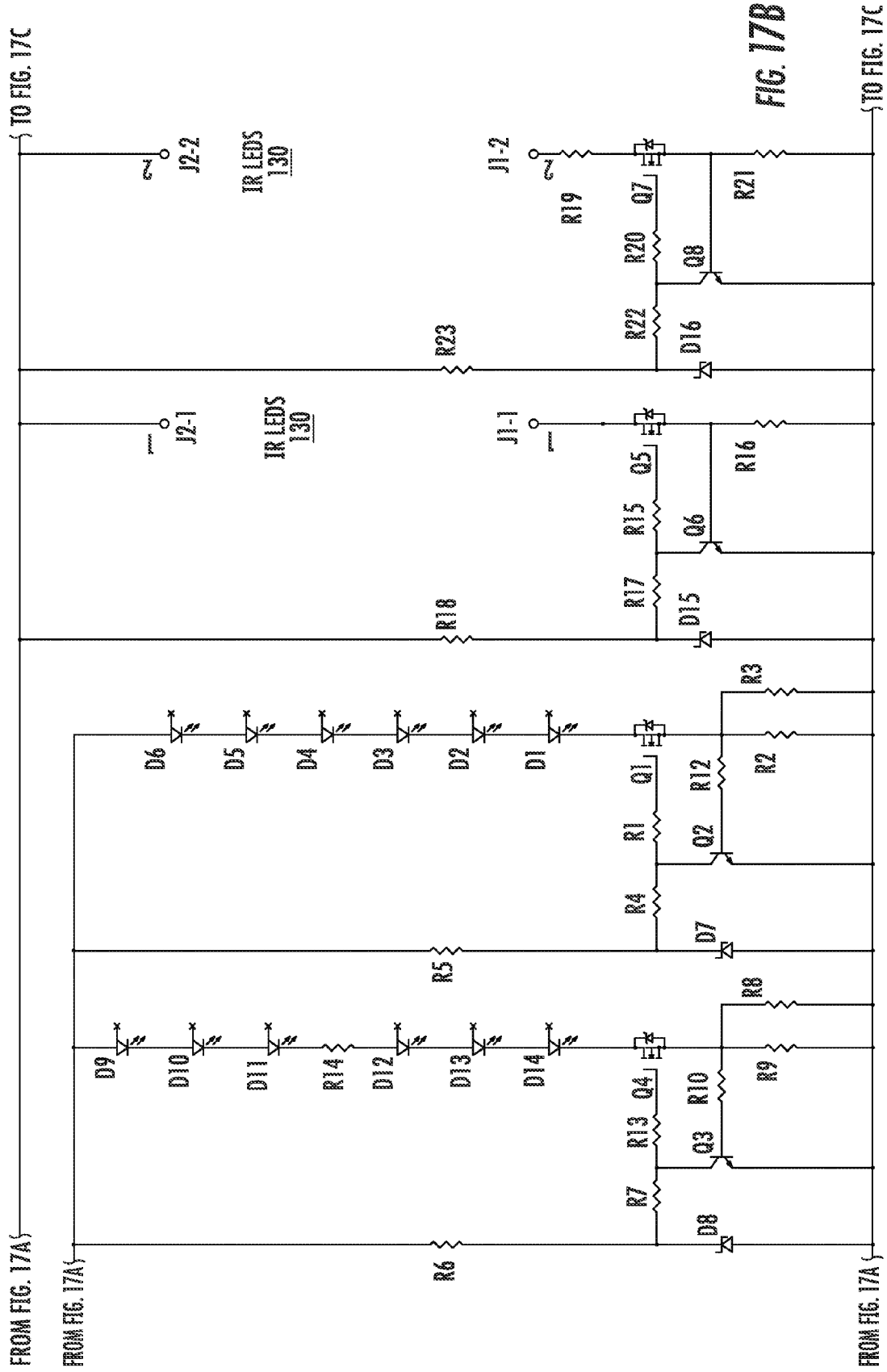

A visible and infrared light generator 32 is supported for movement about a horizontal axis defined by stub shafts 68 connected to the tilt motor 70 and drive 72. Visible light is generated in the disclosed embodiment by two banks of twelve Cree XRE 100 lumen white LEDs 100. The banks of twelve white LEDs 100 shown in FIGS. 16, 17A and 17B are laterally spaced apart on a metal core PC board 86. The space between these banks of visible white light generating LEDs 100 is occupied by a plurality of infrared light generating LEDs 130 as shown in FIGS. 12, 13, 15, 18 and 19. Other white light generating LEDs are compatible with the disclosed spotlight. The disclosed white LEDs 100 are drivable at input currents over a range from 350 mA to 1,000 mA. The white LEDs 100 generate a wide angle or "lambertian" light pattern. The disclosed spotlight includes TIR optics 88, with a TIR lens positioned over each LED to reconfigure the wide angle light pattern into a substantially collimated beam having a spread of approximately 8°, or approximately 4° to either side of the optical axis of the LEDs. This optical configuration is designed to provide a tightly collimated spot beam of approximately 5,000 lumens when the Cree XRE LEDs are driven at an input current of approximately 750 mA-850 mA. Input current is applied to sets of six white LEDs according to the schematic of FIGS. 17A-17C (which illustrates strings of 6 LEDs in a 24 volt system).

Figure 17C:
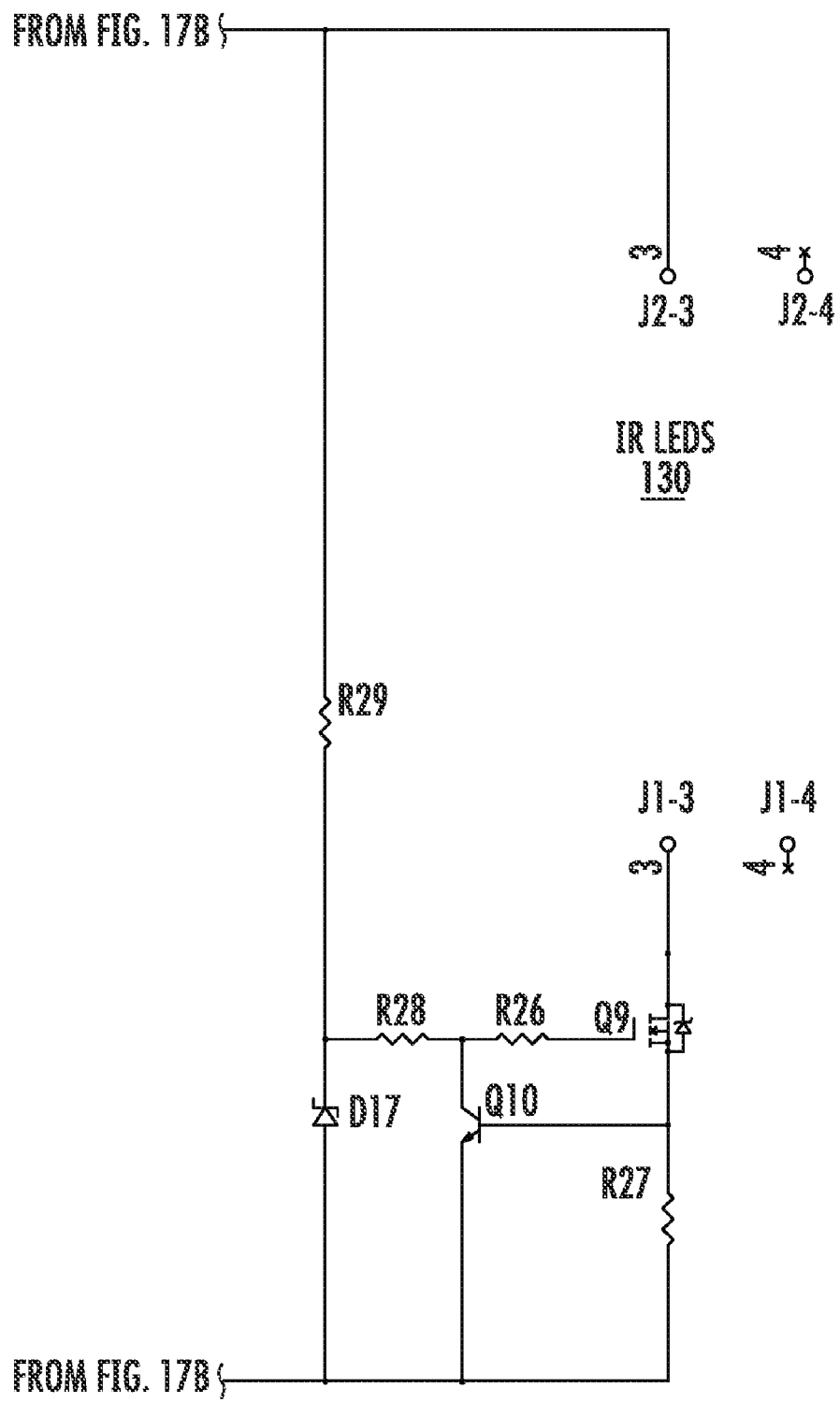

FIGS. 17A-17C illustrate a temperature sensitive current regulator where current is applied to the LEDs through a FET where the gate of the FET is controlled an NPN bipolar transistor. When turned on, the constant current sources shown in FIGS. 17A-17C quickly reach a stable state where the current flowing through the LEDs is regulated by the voltage dropped over sense resistor(s), which is applied to the gate of the bipolar transistor. As the temperature of the base/collector junction of the NPN transistor increases, its bias voltage decreases, causing the NPN transistor to regulate voltage a the FET gate, reducing current through the FET. This arrangement reduces current applied to the LEDs as the temperature of the NPN transistor increases. For example, the current sources of FIGS. 17A-17C reduces current applied to the LEDs by about 30% at a temperature of approximately 100° C. As shown in the board layout of FIG. 16, the current sources for the white LEDs 100 and IR LEDs 130 are mounted on the metal core PC board 86, where they are directly exposed to the temperature of the LEDs. This arrangement automatically reduces current delivered to the LEDs when temperatures approach the safe operating limits of the LEDs.

As shown in FIGS. 17A-17C, similar current regulators are used to drive the IR LEDs 130. The IR LEDs have a lower voltage drop, so series strings of 13-14 IR LEDs are driven by each current regulator in a 24 volt system. In the disclosed spotlight 10, 4 of the disclosed current regulators are used to drive the 24 visible light generating LEDs, while 3 of the disclosed current regulators are used to drive the 40 IR LEDs. Regulators for the visible and IR LEDs are supported on the metal core PC board and are exposed to the temperature of the metal core PC board and, by extension, the temperature of the visible LEDs. The disclosed temperature sensitive current regulator circuit is designed to prevent damage to the white LEDs from excessive heat.

Figure 18:
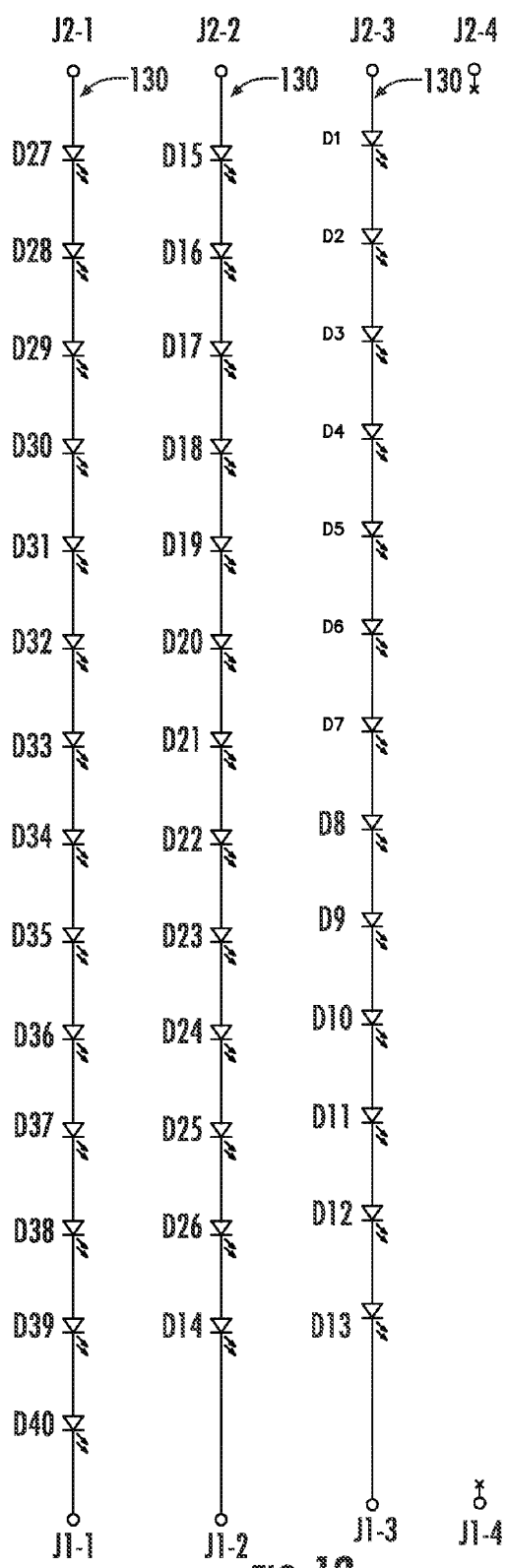
FIG. 18 is a schematic of the infra red LEDs driven by constant current sources of the right hand portion of FIGS. 17B and 17C.
Figure 19:
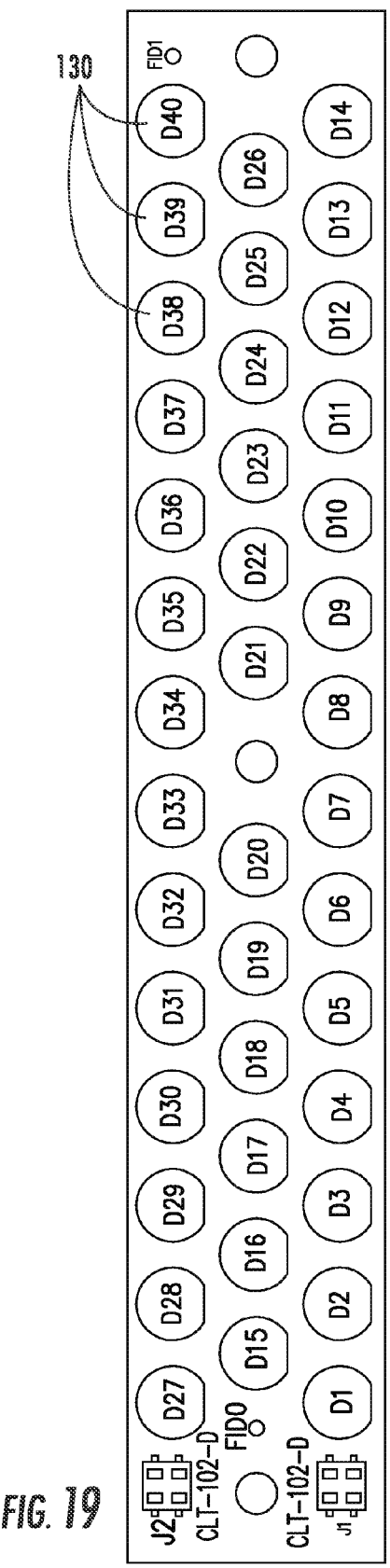
FIG. 19 is a board layout showing the arrangement of infrared LEDs of FIG. 18.

As shown in FIGS. 18 and 19, the 40 infrared generating LEDs 130 are arranged on a separate FR4 PC board which will be secured to the light generator between the spaced banks of white LEDs and their optics. The infrared LEDs will be selected to generate a focused beam of 7.5 watts of infrared light. One example of such a subassembly would include between 28 and 42 Osram SFH 4550-FW LEDs. These LEDs are of the 5 millimeter type, and include an integral lens configured to generate a light pattern having a 3° viewing angle. Viewing angle is defined as the angle with respect to the optical axis of the LED at which the light intensity of the LED falls to one half of its peak intensity. The selected IR LEDs have a beam light pattern of approximately 6°. LEDs having IR output in the range above 900 nM (940 nm for example, instead of 850 nm) have proven desirable, because they emit little or no visible light. It is preferred that the spotlight not emit any visible light when operating in the IR (blackout) mode.

The thermal design of the light generator 32 includes a metal core PC board 86, a finned heat sink 90 and a cooling fan 92 supported on a bracket 94. The cooling fan 92 helps spread heat from the heat sink 90 throughout the spotlight assembly so heat is radiated from more surfaces of the spotlight, such as the entire surface of the dome 14 and the base 12. Temperature sensitive current regulators provide active protection as described above Various embodiments of the disclosed spotlight are described with reference to the drawings. Variations of the disclosed embodiments may become apparent upon reading the foregoing description. The appended claims are intended to encompass all modifications, variations and equivalents of the disclosed subject matter.

The invention claimed is:
1. A spotlight comprising:
a base;
a dome secured to said base to define an interior space;
a support rotatable about first and second perpendicular axes;
a first drive arranged to rotate the support about said first axis in response to first control inputs and a second drive arranged to rotate the support about said second axis in response to second control inputs;
a light generator secured to said support for movement therewith, said light generator including a first plurality of LEDs that generate white light when energized and a second plurality of LEDs that generate infrared light when energized, each of said LEDs having an optical axis about which said white light or IR light is emitted in a first direction, said first and second pluralities of LEDs fixed with said optical axes generally parallel, said light generator including drive circuits for applying current to said LEDs, said drive circuits including current regulators mounted in thermal connection with at least said first plurality of LEDs so that the temperature of said first plurality of LEDs is substantially the same as the temperature of said current regulators, said current regulators modulating said current applied to said first and second pluralities of LEDs in response to the temperature of said first plurality of LEDs;
a control interface including actuators responsive to user inputs to generate said first and second control inputs; and
a drive controller responsive to said first and second control inputs to activate said first and second drives to rotate said support about said first and second axes to direct light generated by said first and second pluralities of LEDs as desired by a user.

2. The spotlight of claim 1, wherein said first plurality of LEDs and said current regulators are mounted to the same thermally conductive PC board and the temperature differential between said first plurality of LEDs and said current regulators is less than 5° F.

3. The spotlight of claim 1, wherein said support comprises:
a turntable continuously rotatable about said first axis and supported at a plurality of positions laterally spaced from said first axis.

4. The spotlight of claim 1, wherein said control interface comprises a pressure sensitive actuator and said control interface generates first and second control inputs which vary according to the pressure applied to said actuator; and
said drive controller activates said first and second drives according to said first and second inputs whereby greater pressure applied to said actuator results in faster rotation of said support about said first and second axes.

* * * * *